(12) United States Patent
Dehkordi

(10) Patent No.: US 11,592,684 B2
(45) Date of Patent: Feb. 28, 2023

(54) SYSTEM AND METHOD FOR GENERATING COMPACT LIGHT-FIELD DISPLAYS THROUGH VARYING OPTICAL DEPTHS

(71) Applicant: BRELYON Inc, San Mateo, CA (US)

(72) Inventor: Barmak Heshmat Dehkordi, San Mateo, CA (US)

(73) Assignee: BRELYON INC, San Mateo, CA (US)

( * ) Notice: Subject to any disclaimer, the term of this patent is extended or adjusted under 35 U.S.C. 154(b) by 279 days.

(21) Appl. No.: 16/684,586

(22) Filed: Nov. 14, 2019

(65) Prior Publication Data

US 2020/0150453 A1 May 14, 2020

Related U.S. Application Data

(60) Provisional application No. 62/767,029, filed on Nov. 14, 2018, provisional application No. 62/806,968, filed on Feb. 18, 2019.

(51) Int. Cl.
*G02B 30/40* (2020.01)
*G02B 27/28* (2006.01)

(52) U.S. Cl.
CPC .......... *G02B 30/40* (2020.01); *G02B 27/283* (2013.01)

(58) Field of Classification Search
CPC ........ G02B 30/33; G02B 30/26; G02B 30/40; G02B 30/60; G02B 30/52; G02B 30/56; G02B 27/283; G02B 27/10; G02B 27/106; G02B 27/145
USPC ....................................................... 359/479
See application file for complete search history.

(56) References Cited

U.S. PATENT DOCUMENTS

| 9,864,205 | B2 | 1/2018 | Bedard et al. |
| 10,514,483 | B2 | 12/2019 | Heshmat Dehkordi et al. |
| 2018/0341171 | A1* | 11/2018 | Choi ...................... G03B 21/56 |
| 2021/0356742 | A1* | 11/2021 | Hong ................. G02B 27/0101 |

OTHER PUBLICATIONS

Dieter Schmalstieg and Tobias Hollerer, Augmented Reality: Principles and Practice, Addison-Wesley Professional (2016).
B. Heshmat, "Fundamental limitations for augmented reality displays with visors, waveguides or other passive optics," COSI conference, FL, USA, 3M5G. 1, (2018).

(Continued)

*Primary Examiner* — Jade R Chwasz

(57) ABSTRACT

A system and method for generating compact light-field displays through varying optical depths provides digital content in a more effective and efficient manner. The system includes a field-evolving cavity with a cavity exit pupil, a relay mechanism, and a system enclosure with an enclosure exit pupil. The field-evolving cavity modifies the light-field displays before outputting the light-field displays with the cavity exit pupil. More specifically, the field-evolving cavity includes at least one display panel, which initially generates the light-field displays, and at least one optical-tuning mechanism, which subsequently modifies the light-field displays to varying optical depths. The system enclosure houses the field-evolving cavity and the relay mechanism. The relay mechanism directs the light-field displays from the cavity exit pupil to the enclosure exit pupil, which outputs the light-field displays to a user.

18 Claims, 15 Drawing Sheets
(15 of 15 Drawing Sheet(s) Filed in Color)

(56) References Cited

OTHER PUBLICATIONS

J. M. Fulvio, & B. Rokers, "Use of cues in virtual reality depends on visual feedback," Sci. Rep. 7, 16009, (2017).
Granrud, C. E., Yonas, A. & Pettersen, L. "A comparison of monocular and binocular depth perception in 5-and 7-month-old infants," J. Exp. Child Psychol. 38, 19-32 (1984).
R. Patterson, "Human factors of 3-D displays," J. Soc. Inf. Disp., 11, 861-871 (2012).
K. Ukai, & P. A. Howarth, "Visual fatigue caused by viewing stereoscopic motion images: Background, theories, and observations," Displays, 29, 106-116 (2008).
D. M. Hoffman, A. R. Girshick, K. Akeley, & M. S. Banks, "Vergence—accommodation conflicts hinder visual performance and cause visual fatigue," J. Vis. 28, 1-30 (2008).
C. Vienne, L. Sorin, L. Blondé, Q. Huynh-Thu, & P. Mamassian, "Effect of the accommodation—vergence conflict on vergence eye movements," Vision Res. 100,124-33 (2014).
I. Bülthoff, H. Bülthoff, & P. Sinha, "Top-down influences on stereoscopic depth-perception," Nat. Neurosci. 3, 254-257, (1998).
Y. Tsushima, K. Komine, Y. Sawahata, & N. Hiruma, "Higher resolution stimulus facilitates depth perception: MT1 plays a significant role in monocular depth perception," Sci. Rep., 4, 6687 (2014).
B. Heshmat, M. Tancik, G. Satat & R. Raskar, "Photography optics in the time dimension," Nature Photonics, 12, 560-566 (2018).
D. Fattal, Z. Peng, T. Tran, S. Vo, M. Fiorentino, J. Brug & R. G. Beausoleil, "A multi-directional backlight for a wide-angle, glasses-free 3D display" Nature 495, 348-351 (2013).
H. Huang and H. Hua, "Systematic characterization and optimization of 3D light field displays," Opt. Express 25, 18508-18525 (2017).
K. J. Mackenzie, D. M. Hoffman & S. J. Watt, "Accommodation to multiple-focal-plane displays: Implications for improving stereoscopic displays and for accommodation control," J. Vis., 10, 22 (2010).
G. Weizstein, D. Lanman, W. Heidrich, R. Raskar, "Layered 3D: tomographic image synthesis for attenuation-based light field and high dynamic range displays," ACM Transactions on Graphics (ToG) 30, 95 (2011).
G. Wetzstein, M. Hirsch, W. Heidrich, R. Raskar, D. Lanman, "Polarization fields: dynamic light field display using multi-layer LCDs," ACM Transactions on Graphics (TOG), 30, 186 (2011).
N. Matsuda, A. Fix, D. Lanman, "Focal surface displays," ACM Transactions on Graphics (TOG), 36, 86 (2017).
S. Tay, P. A. Blanche, R. Voorakaranam, A. V. Tunç, W. Lin, S. Rokutanda, T. Gu, D. Flores, P. Wang, G. Li, P. St Hilaire, J. Thomas, R. A. Norwood, M. Yamamoto & N. Peyghambarian, "An updatable holographic three-dimensional display," Nature 451, 694-698 (2008).
F. Yaraş, H. Kang, and L. Onural, "State of the Art in Holographic Displays: A Survey," J. Display Technol. 6, 443-454 (2010).
Y. Takaki and N. Nago, "Multi-projection of lenticular displays to construct a 256-view super multi-view display," Opt. Express 18, 8824-8835 (2010).
D. Teng, Z. Pang, Y. Zhang, D. Wu, J. Wang, L. Liu, and B. Wang, "Improved spatiotemporal-multiplexing super-multiview display based on planar aligned OLED microdisplays," Opt. Express 23, 21549-21564 (2015).

\* cited by examiner

SYSTEM AND METHOD FOR GENERATING COMPACT LIGHT-FIELD DISPLAYS THROUGH VARYING OPTICAL DEPTHS

The current application claims a priority to the U.S. Provisional Patent application Ser. No. 62/767,029 filed on Nov. 14, 2018 and a priority to the U.S. Provisional Patent application Ser. No. 62/806,968 filed on Feb. 18, 2019.

FIELD OF THE INVENTION

The present invention relates generally to light-field displays. More specifically, the present invention is a system for creating compact light-field displays through varying optical depths.

BACKGROUND OF THE INVENTION

In present society, there has been an increasing traction towards more immersive light-field and/or autostereoscopic three-dimensional (3D) displays due to advancement in electronics and micro fabrications. Unlike stereoscopic 3D, with light-field display the wavefront is manipulated to create depth perception at the monocular level. This can eliminate the accommodation-vergence mismatch and reduce stress on the user's eyes. There have been breakthroughs for realizing more realistic light-field experiences, which can be described in four major methods for creating such experiences with each having its own weaknesses and advantages: super multi-view, computational, multi-focal, and holographic. The super multi-view method provides a light-field at a very compact form but is limited to a very small viewing zone and low resolution. The computational method increases the resolution but produces haze and temporal flickering artifacts. The holographic method can struggle with color nonuniformity and fringing or specular artifacts. The multi-focal method can produce clean images, but not scalable images. Also, devices employing a multi-focal method can be bulky. However, universal to all current methods of light field displays are these following issues: large bandwidth requirements, a reliance on expensive and/or advanced components that are not easily mass produced such as tunable lenses; poor color uniformity, small field of view or viewing zone, low brightness, haze and diffraction artifacts, limited depth range, and the occasional necessity to wear specialized glasses. These challenges have significantly limited the use or production of light-field displays in commercial and/or industrial settings. Therefore, what is needed is a thorough class of optical methods that in some embodiments uses a set of reflectors positioned in a cavity to multiplex different liquid crystal displays (LCD) or different portions of a single LCD onto different optical focal planes. This can allow a light-field within the cavity to adapt into or to certain optical depth(s) before it exits the cavity's exit pupil, while resolving the previously discussed issues associated with other methods of light field display.

An objective of the present invention is to provide users with a device that can be a compact system of creating light field displays at or through varying optical depths. The present invention intends to provide users with a device that address the previously discussed issues associated with current methods of light field displays. The present invention intends to provide users with a device that is less expensive and easier to produce at or for commercial and/or industrial levels. The present invention intends to provide users with a device that reduces artifacts without reducing the clarity of the light field display. The present invention intends to provide users with a device that allows users to produce content for light field displays more easily than conventional stereoscopic displays. The present invention intends to provide users with a device that does not require additional accessories or specialized components to be utilized by the user in order to view the content of the light field display; such as specialized glasses or rending engines, respectively. The present invention intends to provide users with a device that can reduce optical path difference to each focal plane of the light-field display and minimize the light loss from polarization. The present invention intends to provide users with a device that can vary the display focal plane without any mechanical motion.

SUMMARY OF THE INVENTION

The present invention is system for creating compact light-field displays through varying optical depths. The present invention primarily contains a housing. The housing contains a plurality of panels in a variety of arrangements in which the present invention can produce light-field displays of varying degrees or scope. The present invention also contains a relay panel. The present invention contains a cover case atop the housing.

Realizing accurate light-field displays usually requires advanced optical structures that use high-cost light sources and spatial modulators such as laser scanners, tunable lenses, liquid crystal on silicon (LCoS) reflectors or digital micro-mirror devices (DMDs). Accordingly, these existing methods do not provide true optical depth which means that there is inaccuracy in the wavefront in form of diffraction color inaccuracy, speckle, or haze. A class of displays systems and methods revolves around the concept of field-evolving (FE) cavities. These cavities prepare the light in such a way that it provides true optical depth with no distortion to the wavefront, and, therefore, the images provided by such systems are as accurate as a normal display panel. This method uses conventional LCD or organic light-emitting diode (OLED) panel displays in a fashion that provides multiple optical focal planes simultaneously or sequentially in opaque or augmented (transparent) modality. The system can also be conveniently packaged in a small form factor well suited to desktop uses. Since the cavity feeds regular two-dimensional (2D) images and combines them optically into a 3D light-field; there is not necessity for complex rendering engines. The methods are also scalable to large scale displays for commercial uses.

BRIEF DESCRIPTION OF THE DRAWINGS

The patent of application file contains at least one drawing executed in color. Copies of this patent or patent application publication with color drawing(s) will be provided by the office upon request and payment of the necessary fee.

The following description illustrates aspects of embodiments of the disclosed apparatuses, methods, and systems in more detail, by way of examples, which are intended to be non-limiting and illustrative with reference to the accompanying drawings, in which.

DETAILED DESCRIPTION OF THE INVENTION

Figure 1:
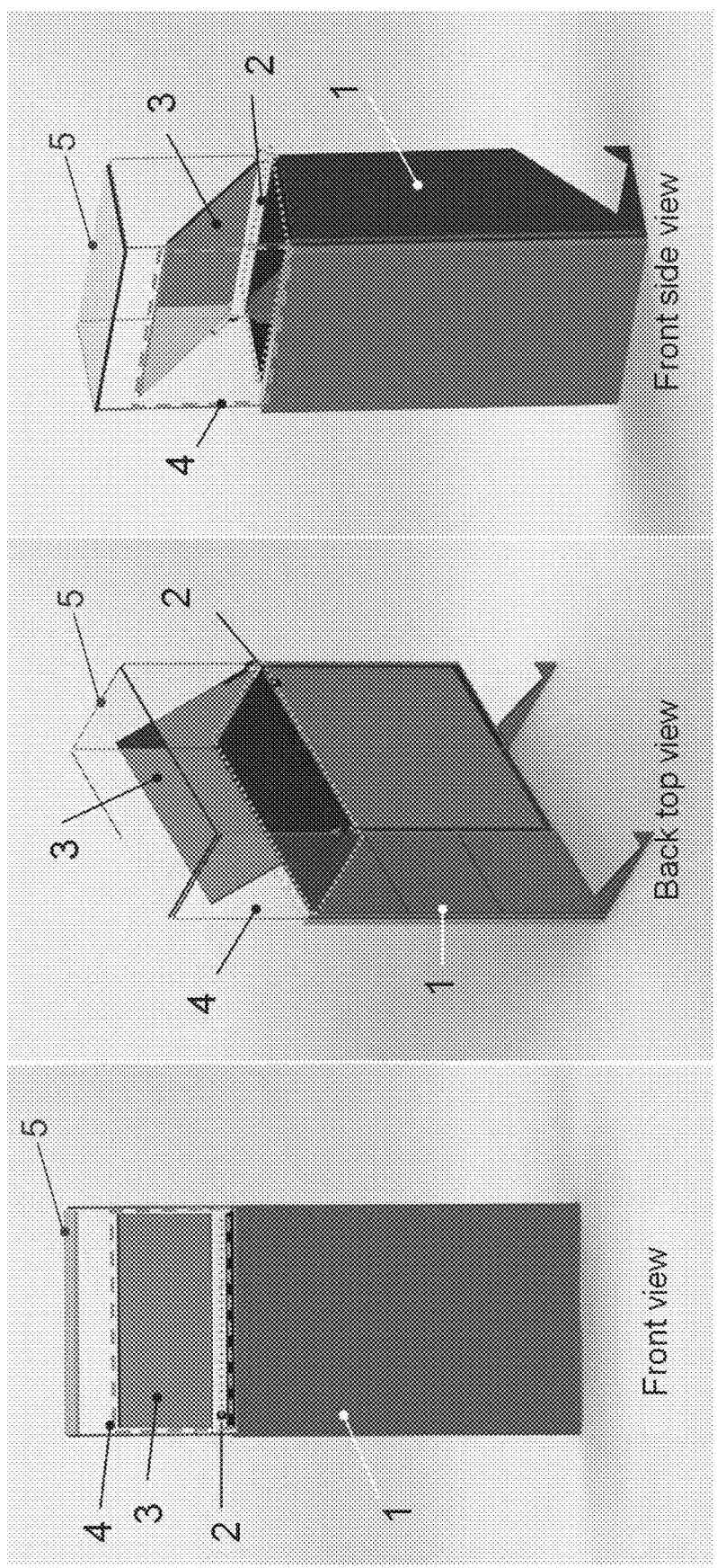
FIG. 1 illustrates a light-field display based on a three layer field-evolving cavity, wherein a non-limiting example of the 3D model of a 3-layer light-field display prototype, wherein a front view is shown on the left, a back top view is shown in the middle, and a front side view is shown on the right.

All illustrations of the drawings are for the purpose of describing selected versions of the present invention and are not intended to limit the scope of the present invention.

In conventional binocular or stereographic vision, the display system provides two offset images separately to the left and right eye of the viewer. These two-dimensional images along with accommodation of the eye lenses are then combined in the brain of the viewer to give the perception of 3D depth in front of the viewer. If the true optical depth (curvature of the wavefront) does not match the parallax provided by the stereoscopic images, then the viewer experiences a bit of uncomfortable inaccuracy, since his/her eye lenses are telling the brain that the image is at a certain distance and that the parallax is telling the brain otherwise. This is known as accommodation-vergence mismatch. Light-field display systems change the wavefront in such a way to provide both parallax and accommodation cues. Conventional methods of providing light-field has been limited by cost, accuracy of the image, bandwidth, need for wearing headsets or glasses, bulkiness, and manufacturability.

To overcome this tradeoff between perceived content realism and manufacturability, the present invention uses a field-evolving cavity built around conventional LCD or OLED panel displays to produce digital content at one or more display focal depths which are then relayed to the outside world. This approach does not require tunable lenses, extensive computational rendering engines; does not necessarily rely on freeform optics, can be cost-efficiently manufactured, and provides the light-field experience for any number of users within the large viewing zone General Purpose The present invention provides multi-layer light field experience in a mass producible way with image accuracy comparable to the high-quality displays. The purpose of present invention is the realization of a compact and practical transparent or opaque light-field display, which does not suffer from accommodation-vergence conflict and does provide true optical depth. Such a display has wide-ranging utility in a variety of contexts, further elaborated upon hereinafter. The light-field can be used as an entertainment display, for commercial applications or industrial use cases such as in navigation or biomedical use cases. In near-head use cases, the present invention provides virtual depth or optical space which seems like a virtual window and can provide sense of scale despite having a small pupil. For example, the present invention can magnify a 13-inch exit pupil sitting 10 inches from the head to seem like a 60-inch monitor sitting at 3 meters away from the user.

In the preferred embodiment, the present invention comprises a system enclosure 5, a field-evolving cavity 1, and a relay mechanism 3, which are shown in FIGS. 1 through 13. The system enclosure 5 is used to house the other components of the present invention. Thus, the field-evolving cavity 1 and the relay mechanism 3 are mounted within the system enclosure 5. The field-evolving cavity 1 is a compact body that is responsible for modifying the light-field displays. Moreover, the field-evolving cavity 1 comprises a cavity exit pupil 2, at least one display panel 6, and at least one optical-tuning mechanism 7. The display panel 6 generates the initial light-field display, which is modified by the optical-tuning mechanism 7, and the modified light-field display is then outputted by the cavity exit pupil 2. In addition, the display panel 6 and the optical-tuning mechanism 7 are configured into a specific optical arrangement, which allows for at least one light-field display 6 to be generated with at least one focal plane along at least one optical path. The optical path specifically traverses from the display panel 6 to the cavity exit pupil 2. The relay mechanism 3 is used to transfer the modified light-field display from the cavity exit pupil 2 to an enclosure exit pupil 4 of the system enclosure 5, and, thus, the cavity exit pupil 2 is in optical communication with the enclosure exit pupil through the relay mechanism 3.

FIG. 1 illustrates the field-evolving cavity 1 for a prototype model of the present invention. The cavity exit pupil 2 is also shown by dotted line rectangular frame in FIG. 1. The relay mechanism 3 in this case a simple mirror or switchable mirror and relays the cavity exit pupil 2 to the enclosure exit pupil 4. The enclosure exit pupil 4 also allows the light that exits this pupil reach the user or users directly with no further manipulation. This enclosure exit pupil 4 is shown with dashed line rectangular frame in FIG. 1.

Technical Description

Figure 2:
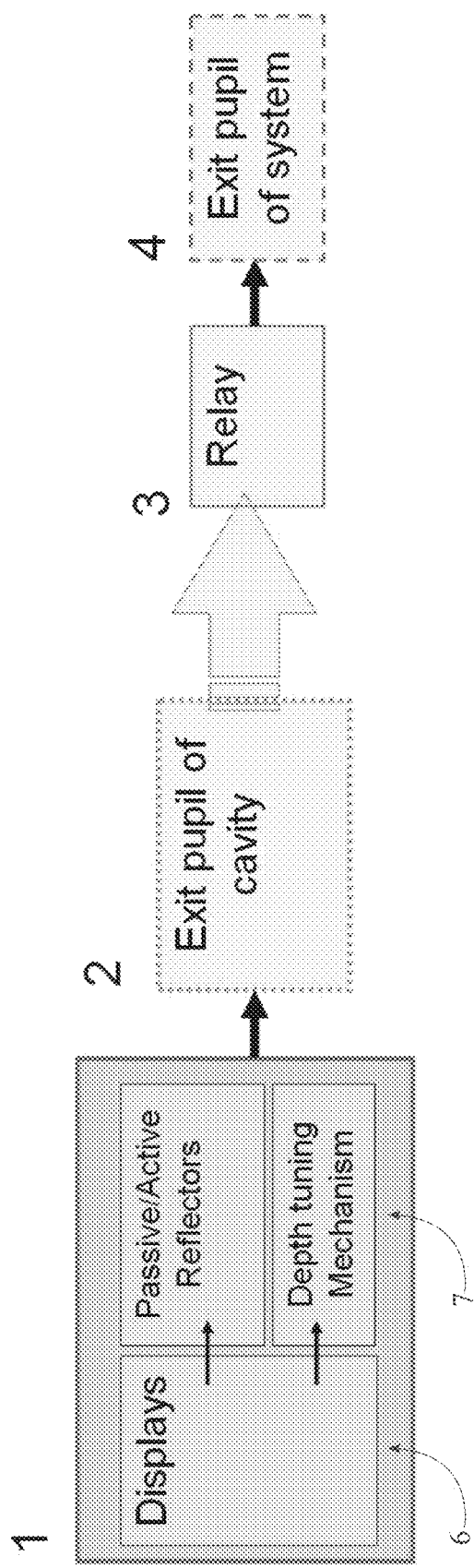
FIG. 2 illustrates a generalized block diagram of the cavity-based light-field systems in this disclosure, wherein a block diagram of a FE cavity based light-field display system, and wherein the cavity generates light from multiple focal planes and feeds it to a relay mechanism which then projects it to outside world.

Aspects of the disclosed apparatuses, methods, and systems describe various methods, systems, components, and techniques that enable the display of digital content at two or more focal planes and contribute to a significant reduction of the size and cost of the light-field display systems. The disclosed apparatuses, methods, and systems work by generating digital content at multiple depths within a field-evolving cavity 1 and relaying this content to the user's eyes, as illustrated in FIG. 2.

First, digital content is generated within a field-evolving cavity 1, at one or more depths. This may be done in a variety of ways, the details of which are described in the section titled "Design of the field-evolving cavity". Then, a relay mechanism 3 is used to enable a user to view the digital content in different modalities, the details of which are described in the section titled "Relay mechanisms and application modalities".

Additionally, the technology described herein may be used not only for larger scale displays such as desktop monitors, television sets, and heads-up displays but also in a new modality of near-head displays. The details of this application extension are described in the section titled "Relay mechanisms and application modalities". The thickness of the field-evolving cavity 1 may be reduced with use of sequential relaying inside and outside of the field-evolving cavity 1, the details of which is explained in the section titled "Compressed designs". Details of a nonlimiting example of a practical prototype are given in the section entitled "Prototype model".

This disclosure has four major aspects or focuses: (1) the design of the field-evolving cavity 1 necessary to generate one or multiple focal planes from one or more display panels, (2) the methods of generating different tunable focal planes (i.e., light-field with tunable planes) by varying or elaborating the cavity arrangement or using switchable mirrors or LCD layers; (3) elaboration on the means of relaying light from the cavity exit pupil 2 to the enclosure exit pupil 4; and (4) elaboration to compressed designs and near-head use cases Design of the Field-Evolving Cavity In order to provide true optical depth for different layers of a light-field, there needs to be an optical mechanism that prepares or manipulates the curvatures of the wavefront of the light which is true to that depth or correct for that depth. The various embodiments of the field-evolving cavity 1, illustrated in FIGS. 3 through 13, are cavities or void spaces comprising at least one display panel 6 (based on Liquid Crystal Displays (LCD), Thin-film Transistor (TFT), Light Emitting Diode (LED), Organic Light Emitting Diode arrays (OLED), Active Matrix Organic Light Emitting Diode (AMOLED), projection on flat screen or any other display technology) and/or at least one mirror 8 and/or at least one half mirror 9 and/or a plurality of switchable mirrors 13 or at least one liquid crystal cell layer 16 arranged and assembled in such a way as to exit bundles of light with divergence apex at different depths from the cavity exit pupil 2. These apexes can be from different displays at different depths inside the field-evolving cavity 1 or from a single display panel 6 along the entirety of the field-evolving cavity 1. The cavity exit pupil 2 delivers light into a relay mechanism 3, resulting in a different or same reference apex (depending on the type of relay) of divergence for different focal planes being presented to the user. The relaying mechanism 3 can be a simple flat or free-form curved surface as further discussed herein or it can be a geometrical or diffractive waveguide, or any other suitable relay means. The relay mechanism 3 can be semi-transparent, opaque, or tunable in transparency (e.g. a switchable mirror).

Since theoretically, there is an infinite number of these types of field-evolving cavities, determining a class of the field-evolving cavity 1 is based on the dimensionality of display arrangement. If all of the display panels 6 are along a single axis (e.g. y axis), then the field-evolving cavity 1 is defined as Class I. More specifically, the display panel 6 is positioned along the single axis, and the single axis is positioned either perpendicular or parallel to the cavity exit pupil 2. Alternatively, if all of the display panels 6 are arranged in both x and y dimensions, then the field-evolving cavity 1 is Class II. More specifically, a plurality of display panels 6 is positioned along a pair of axes, and the pair of axes is positioned perpendicular to each other, while each of the pair of axes being positioned either perpendicular or parallel to the cavity exit pupil 2. Furthermore, the order of the cavity exit pupil 2 is the maximum number of times that the light bundle from any pixel of the display panel 6 is reflected before it exits the cavity exit pupil 2. Any field-evolving cavity 1 that has at least one display panel 6 arranged in an angle that is not a multiple of 90 degrees in x and y is still considered as a Class II cavity but are referred as Class 11 wedge cavities or angled cavities. More specifically, the display panel 6 is positioned along an alignment axis, and the alignment axis is positioned at an angle to the cavity exit pupil 2.

The following descriptions and drawings in FIGS. 3 through 13 provide non-limiting examples of Class I field-evolving cavities, which can be used to generate digital content at multiple focal depths using a single display panel 6 or multiple display panels 6 in parallel arrangements. In all of these configurations, the display panel 6 can use a variety of display technologies such as OLE), LCD, LED, AMO-LED, or any display technologies or projection screen that provides a 2D image. In non-limiting examples of these conceptions, the display panel 6 can be replaced with an LCoS (Liquid crystal on silicon) spatial light modulator illuminated by a sequential RGB light or DMD (Digital Mirror Device) spatial light modulator illuminated by a display. Therefore, in this disclosure, a "display panel" refers to any architecture that provides an array of light that can be focused or collimated to create an image.

In all non-limiting examples and configurations given in FIGS. 3 through 9, the reflectors can be polarization-dependent reflectors, semi-transparent reflectors, thin layer pellicle reflectors, beam splitter cubes, or other suitable reflectors. In all these configurations, the light from different portions of display panels 6 or from different panels 6 can be polarized in such a way to increase the output light efficiency of the light-evolving cavity 1. More specific examples are given in the figures throughout this disclosure.

Figure 3A:
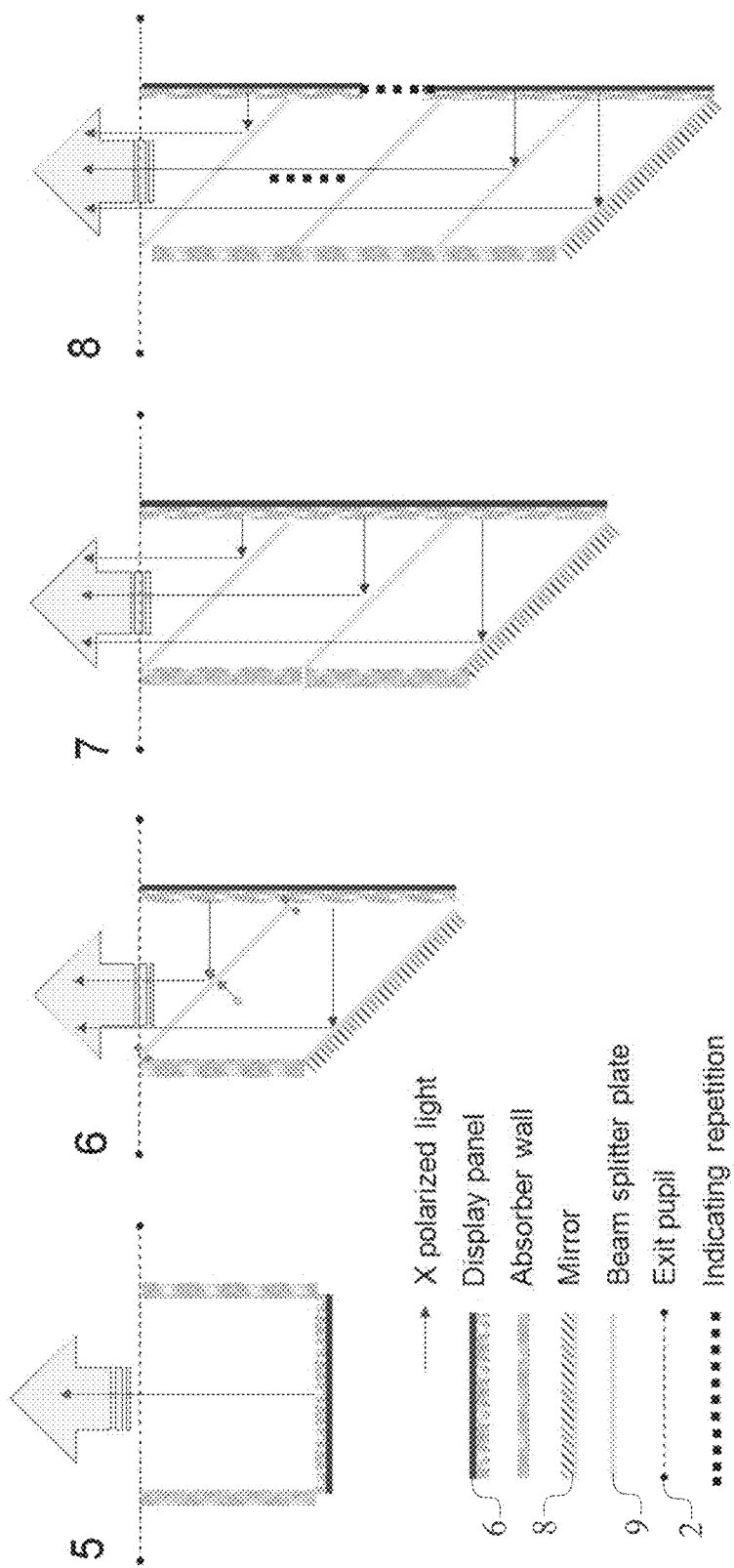
FIGS. 3A, 3B, and 3C illustrate Class I FE cavities examples with first order exit pupil, in which displays are arranged in one dimension or one axis (either vertical or horizontal, and the light for each layer bounces from each reflector only once meaning there is no roundtrips or loops that light go through before getting exiting the cavity, wherein nonlimiting examples of different designs under Class I FE cavities category, ranging from simple to more complex with a greater number of layers.
Figure 3B:
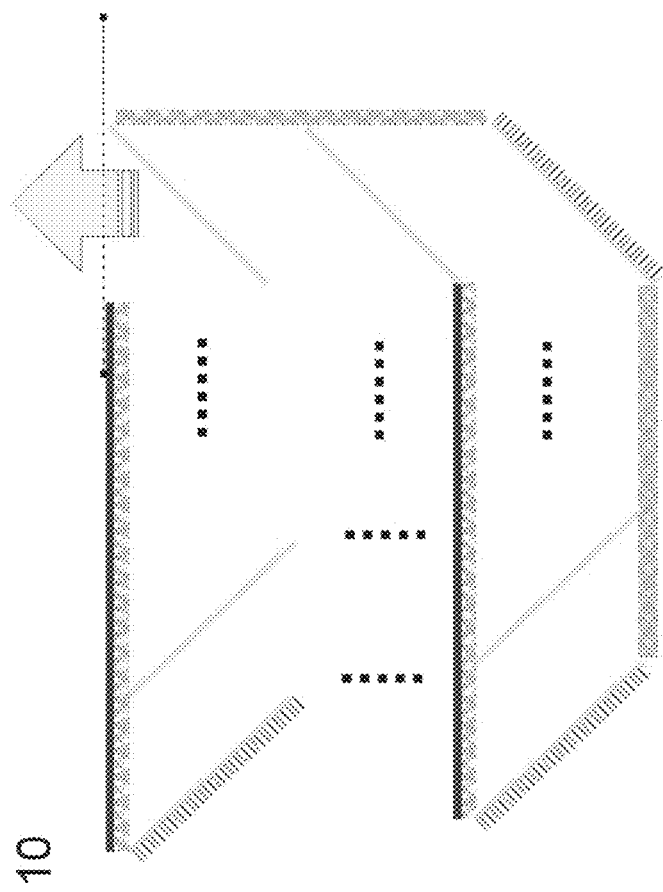
Figure 3B:
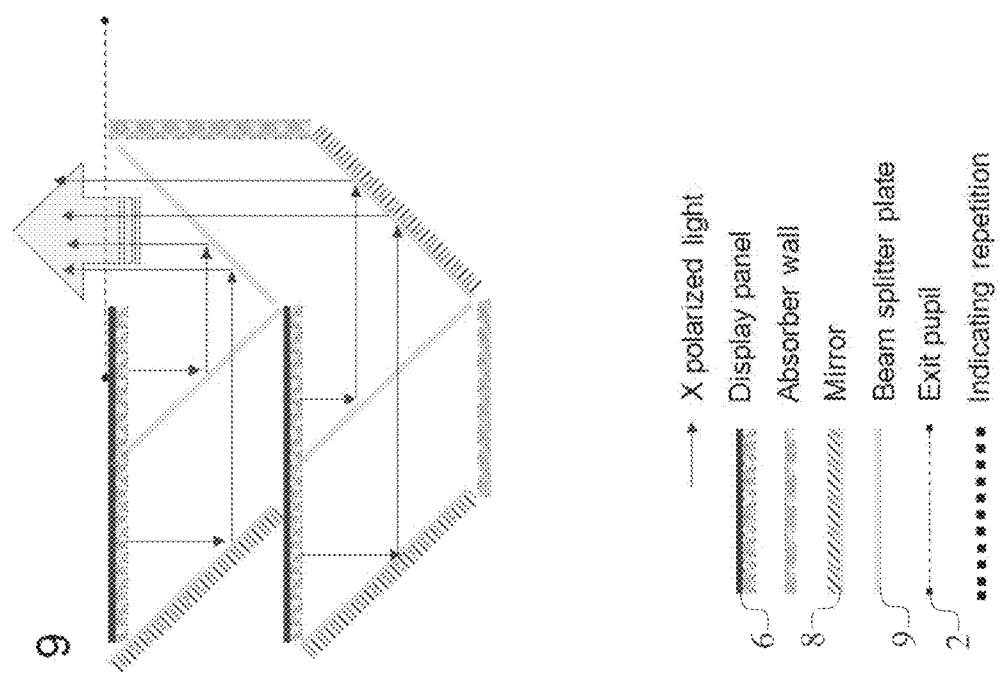
Figure 3C:
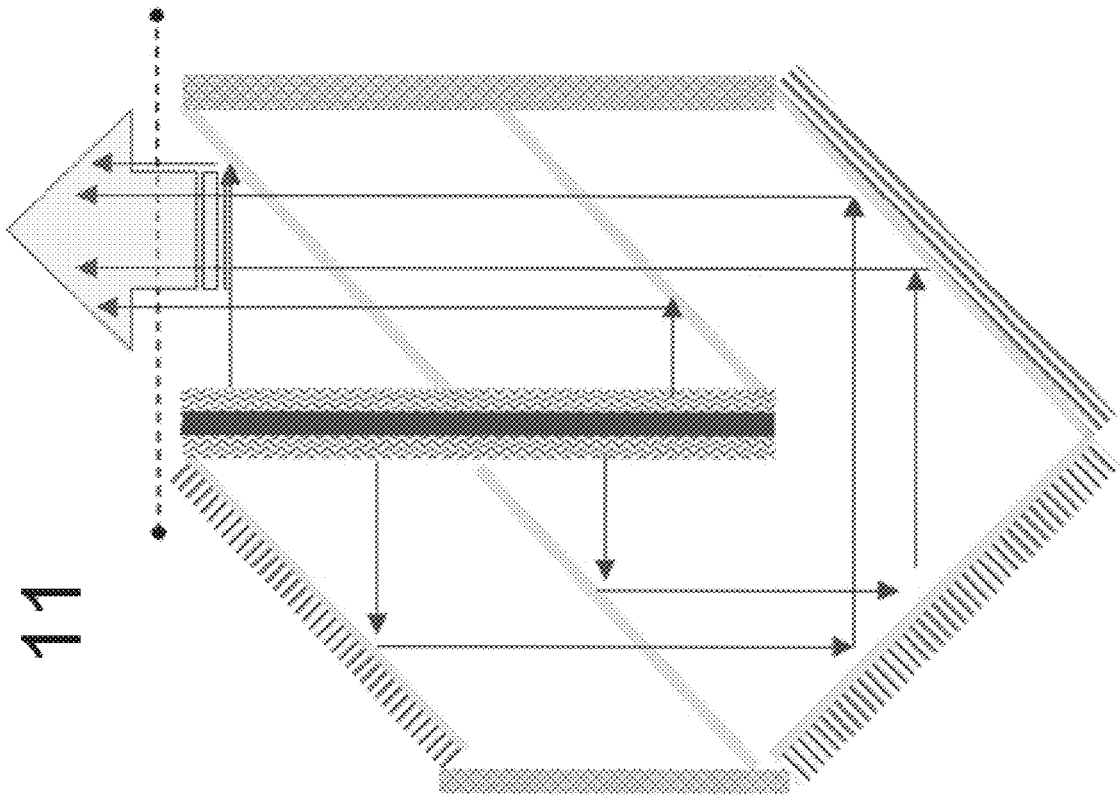
Figure 3C:
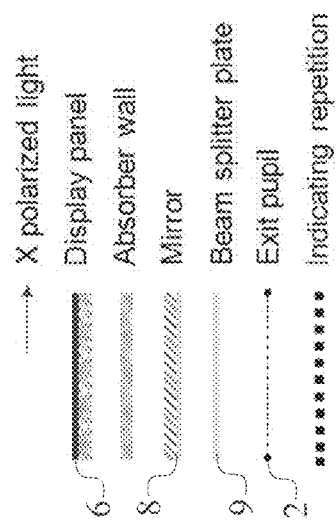

FIGS. 3A, 3B, and 3C illustrates some non-limiting instances of designs for Class I of field-evolving cavities 1. In general, the optical-tuning mechanism 7 may comprise at least one mirror 8 and at least one beam splitter plate 9. As can be seen from sections in FIG. 3, the specific cavity arrangement may be configured to reflect the optical path with the mirror 8, and the specific cavity arrangement may be further configured to reflect the optical path with the beam splitter plate 9, to pass the optical path through the beam splitter plate 9, or combinations thereof.

Section 5 of FIG. 3A illustrates an embodiment of a Class I of a field-evolving cavity 1 with a single display panel 6 at the bottom which produces only a single depth (included for theoretical support). The light directly travels out of the cavity exit pupil 2 without bouncing off of any reflector or other optical surface(s). This is a cavity exit pupil 2 with a zero-order. The orange arrow shows the light bundle exiting the dashed line which is the cavity exit pupil 6 in all the figures in this disclosure. In all the figures, only the light that makes it out of the light-evolving cavity 1 is shown with red or blue arrows. The light that is wasted is not indicated in these drawings for simplicity. Also for any beam splitter plate 9, the percentage of reflectivity can be chosen in such a way to maximize the brightness uniformity of all layers. This does not change the architecture of the design, and, thus, the reflectivity percentage is not specified through this disclosure. The reflectivity percentage can be assumed 50% for all the designs for simplicity.

Section 6 in FIG. 3A illustrates an embodiment of a Class I of a field-evolving cavity 1 comprising a single display panel 6 on the right wall which produces digital content simultaneously at two different depths. By incorporating a beam splitter plate 9 (half-mirror sheet) and a mirror 8 to combine and redirect light out of the cavity exit pupil 2. The light from the upper portion of the display panel 6 reflects off of a mirror 8, passes through a beam splitter plate 9 and half of its intensity is outputted through the cavity exit pupil 2. The light from the lower portion of the display panel 6 reflects off of the beam splitter plate 9, and half of its intensity is directed toward the cavity exit pupil 2. Therefore, this is a Class I of a field-evolving cavity 1 with a first order, and the intensity of each focal plane is half of the original intensity of the display panel 6. In some examples of this type of field-evolving cavity 1 one or more of the reflectors might be shifted up or down to change the desired depth that is output to the cavity exit pupil 2.

Section 7 in FIG. 3A illustrates an extension of Section 6 in FIG. 3A, in which a single display panel 6 is used to generate digital content simultaneously at three different depths. In some embodiments, the optical efficiency of the field-evolving cavity 1 may be different for different depths, and, therefore, the brightness of the display panel 6 could be adjusted to accommodate this variation. For example, if the beam splitter plates 9 have 50% reflection and 50% transmission, the light from the topmost part of the display panel 6 passes through two beam splitter plate 9, and, thus, its intensity is reduced to 25% of 10 the intensity of the display panel 6, the light from the middle section passes through two beam splitter plates 9 and also has 25% of the intensity for the display panel 6, but the light from the lowermost section only passes through one beam splitter plate 9, and, therefore, the intensity is 50% of the intensity of the display panel 6. To compensate for this variation in intensity across focal depths, the brightness on the lowermost part could be reduced by 50% electronically through the signal that is given to the display panel 6. Such brightness adjustments can be applied to the various configurations in FIGS. 3 through 13 to provide uniform brightness for different layers of the light-field.

Section 8 in FIG. 3A illustrates the ultimate extension of Section 6 in FIG. 3A, in which a single display panel 6 is used to generate digital content at an arbitrary number of depths.

Section 9 in FIG. 3B illustrates an extension of Section 6 in FIG. 3A in which two field-evolving cavities 1 (each producing content at two depths) are combined to generate digital content simultaneously at four different depths.

Section 10 in FIG. 3B illustrates an extension of Sections 8 and 9 in FIGS. 3A and 3B, in which multiple cavities 1 illustrated in Section 8 in FIG. 3A are combined as illustrated in Section 9 in FIG. 3B to generate digital content simultaneously at a plurality of depths.

Section 11 in FIG. 3C illustrates an extension of Section 9 in FIG. 3, in which two display panels 6 are positioned back to back to provide more compact form factor.

Figure 4:
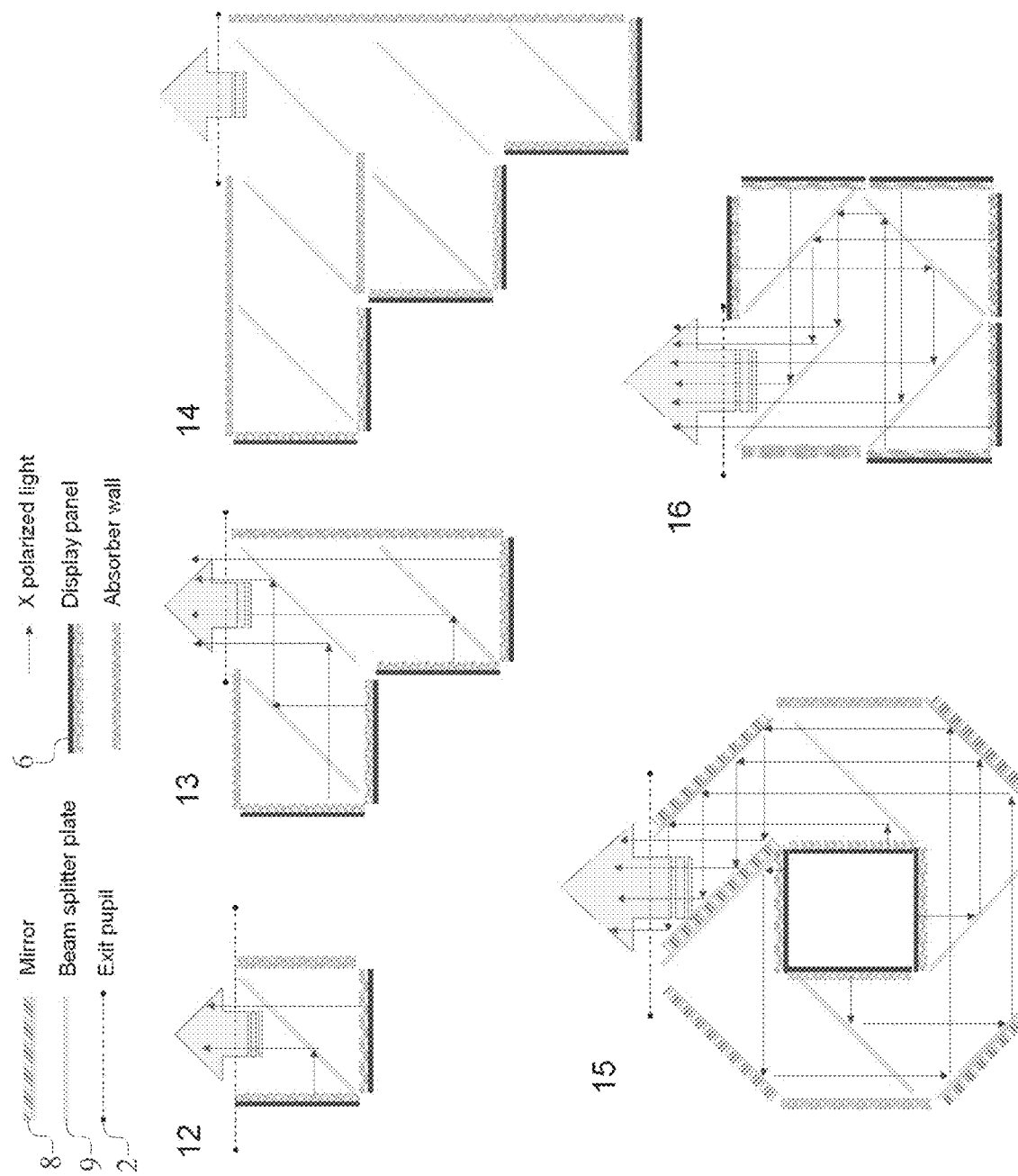
FIG. 4 illustrates instances of Class II FE cavities with first order exit pupil, in Class II displays can be arranged in two dimensions (both horizontal and vertical) to make up the cavity, wherein the first order refers to the fact the light bounces each mirror or reflector no more than once, and wherein more complex Class II FE cavity examples showing how multiple displays can be incorporated along two axes to avoid losing spatial resolution incurred when splitting a display in Class I cavities, and wherein the orange arrow is the light bundle exiting the pupil of the cavity.

FIG. 4 shows non-limiting examples of designs for Class II of field-evolving cavities 1 with the cavity exit pupil 2.

Section 12 in FIG. 4 illustrates an embodiment of a simple Class II of a field-evolving cavity 1 comprising two display panels 6 that are positioned perpendicularly to each other and that are combined with a single beam splitter plate 9. It has the benefit that the two display panels 6 can generate digital content simultaneously at two similar depths. By adjusting the position of one display panel 6, the depth separation between the two focal planes can be easily adjusted.

Section 13 in FIG. 4 illustrates an embodiment of a simple Class II of a field-evolving cavity 1 comprising four display panels 6 that are combined to generate digital content simultaneously at four different depths.

Section 14 in FIG. 4 illustrates the ultimate extension of Section 13 in FIG. 4, which generates digital content simultaneously at a plurality of different depths.

Section 15 in FIG. 4 illustrates an embodiment of a simple Class II of a field-evolving cavity 1 comprising four display panels 6 at the center that are combined to generate digital content simultaneously at four different depths.

Section 16 in FIG. 4 illustrates an embodiment of a simple Class 11 of a field-evolving cavity 1 comprising six display panels 6 that are combined to generate digital content simultaneously at six different depths.

Figure 5:
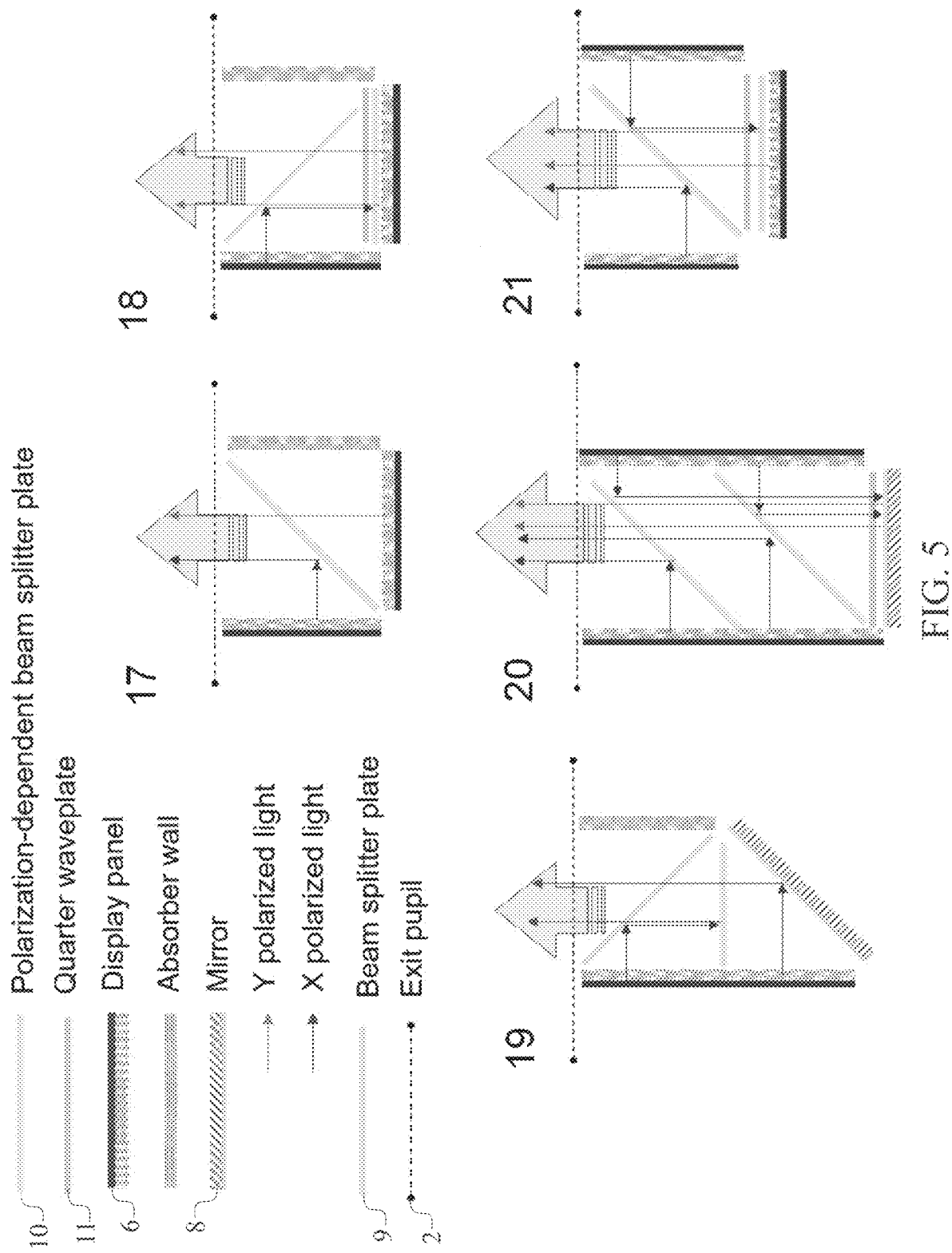
FIG. 5 illustrates instances of Class I and Class II FE cavities with first order and second order exit pupils designed to reduce the optical path difference to each focal plane and minimize light loss; second order means that the light may bounce from one reflector up to two times, wherein examples of FE cavities with higher order exit pupil that are designed to reduce the optical path difference to each focal plane and minimize light loss by using polarization.

FIG. 5 shows examples of Class I field-evolving cavities 1 and Class II field-evolving cavities 1 with higher-order exit pupils 2. These non-limiting examples show how polarization and multiple reflections from the same surfaces can create more compact cavities with a larger number of output focal planes. In general, the optical-tuning mechanism 7 may further comprise at least one polarization-dependent beam splitter plate 10 and at least one quarter waveplate 11. As can be seen from the sections in FIG. 5 the specific cavity arrangement may be configured to reflect the optical path in a first polarization with the polarization-dependent beam splitter plate 10, to pass the optical path in a second polarization through the polarization-dependent beam splitter plate 10, or combinations thereof, wherein the first polarization is the optical opposite of the second polarization. The specific cavity arrangement may further be configured to switch the optical path from a first linear polarization to a second linear polarization with a combination of the quarter waveplate 11 and the mirror 8, wherein the first linear polarization is perpendicular to the second linear polarization.

Section 17 in FIG. 5 illustrates an embodiment of a Class II field-evolving cavity 1 comprising two polarized display panels 6 that are combined with a polarization-dependent beam splitter plate 10. The polarization-dependent beam splitter (PDBS) plate 10 is a beam splitter plate or a reflector sheet that reflects one polarization fully and fully transmits the other perpendicular polarization. It has the benefit that the two display panels 6 can generate digital content simultaneously at two similar depths. By adjusting the position of one display panel 6, the depth separation between the two focal planes can be easily adjusted. It also has the benefit that light loss is minimized by leveraging the polarization of the display panels 6 in conjunction with the PDBS plate 10.

Section 18 in FIG. 5 illustrates an embodiment of a Class II field-evolving cavity 1 with second order that uses a PDBS plate 10 and waveplate 11 to efficiently generate two different focal planes (image depth). In this embodiment, the light from the vertical display panel 6 has a horizontal polarization and hits a PDBS plate 10 that only reflects light with horizontal polarization. Therefore, this light (shown schematically by red arrows) moves upward and passes through a quarter waveplate 11 (shown in purple). This quarter waveplate 11 changes the horizontal polarization to clockwise circular polarization and then it hits a half mirror on top of the horizontal display (shown in blue) which will then reflect it back with counter-clockwise polarization. The quarter waveplate 11 converts that counter-clockwise circular polarization to vertical linear polarization (shown schematically with red arrows). This light passes through the PBDS plate 10 and leaves through the cavity exit pupil 2. Light from the horizontal display panel 6 has counter-clockwise polarization, and by passing through the quarter waveplate 11, the light is converted to vertical polarization which then passes through the PBDS plate 10. This process of using a quarter waveplate 11 alongside a reflective surface 8 can be used extensively in many other configurations for field-evolving cavities 1 as shown in FIGS. 5 through 10. The functionality is identical to the one described for this configuration: the waveplate 11 together with the reflective surface 8 reflects and rotates the polarization by 90 degrees. Therefore, if light with a horizontal polarization goes through those layers, the light reflects back with vertical polarization and vice versa. If a vertically polarized light reflects from this structure, the light will be reflected with horizontal polarization.

Section 19 in FIG. 5 illustrates an embodiment of a Class II field-evolving cavity 1 with second order comprising a single display panel 6 that are combined with a series of beam splitter plates 9 and a mirror 8. It has the benefit that a single display panel 6 can be used to generate digital content simultaneously at two similar depths. By adjusting the position of the central beam splitter plate 9, the depth separation between the two focal planes can be adjusted. This embodiment is a Class I field-evolving cavity 1 since there are display panels 6 only in one dimension, and this embodiment has the cavity exit pupil 2 at second order since the light from the lower part of the display panel 6, reflects once from the lower beam splitter plate 9, and then again by the horizontal half-mirror (it will 10 also pass through the lower beam splitter plate 9 before exiting). Higher order field-evolving cavities 1 can provide more flexibility in terms of design and form factor, but they tend to be less light efficient.

Section 20 in FIG. 5 illustrates an embodiment of a Class II field-evolving cavity 1 with second order comprising two display panels 6, combined with a series of PDBS plates 10. The light from left display panel 6 is x-polarized which is reflected from the reflectors 8 to the cavity exit pupil 2. The light from right display panel 6 is x-polarized which is reflected downward and goes through the waveplate 11, hits the bottom mirror 8, and goes through the waveplate 11 again which will shift its polarization to y-polarization, which would then pass through the PDBS plates 10.

Section 21 in FIG. 5 illustrates an embodiment of a Class II field-evolving cavity 1 with second order that is configured to allow the light from the right display panel 6 is X-polarization, so the light reflects from the PDBS plates 10. The light from bottom display panel 6 has a polarization rotated through the waveplate 11 and passes through the diagonal PDBS plate 10 to the cavity exit pupil 2. The light from the right side display panel 6 is reflected downward by the PDBS plate 10, goes through polarization rotation through waveplate 11, is half-reflected by the beam splitter plate 9 at the bottom, and then passes through the diagonal PDBS plate 10 to the cavity exit pupil 2.

Figure 6:
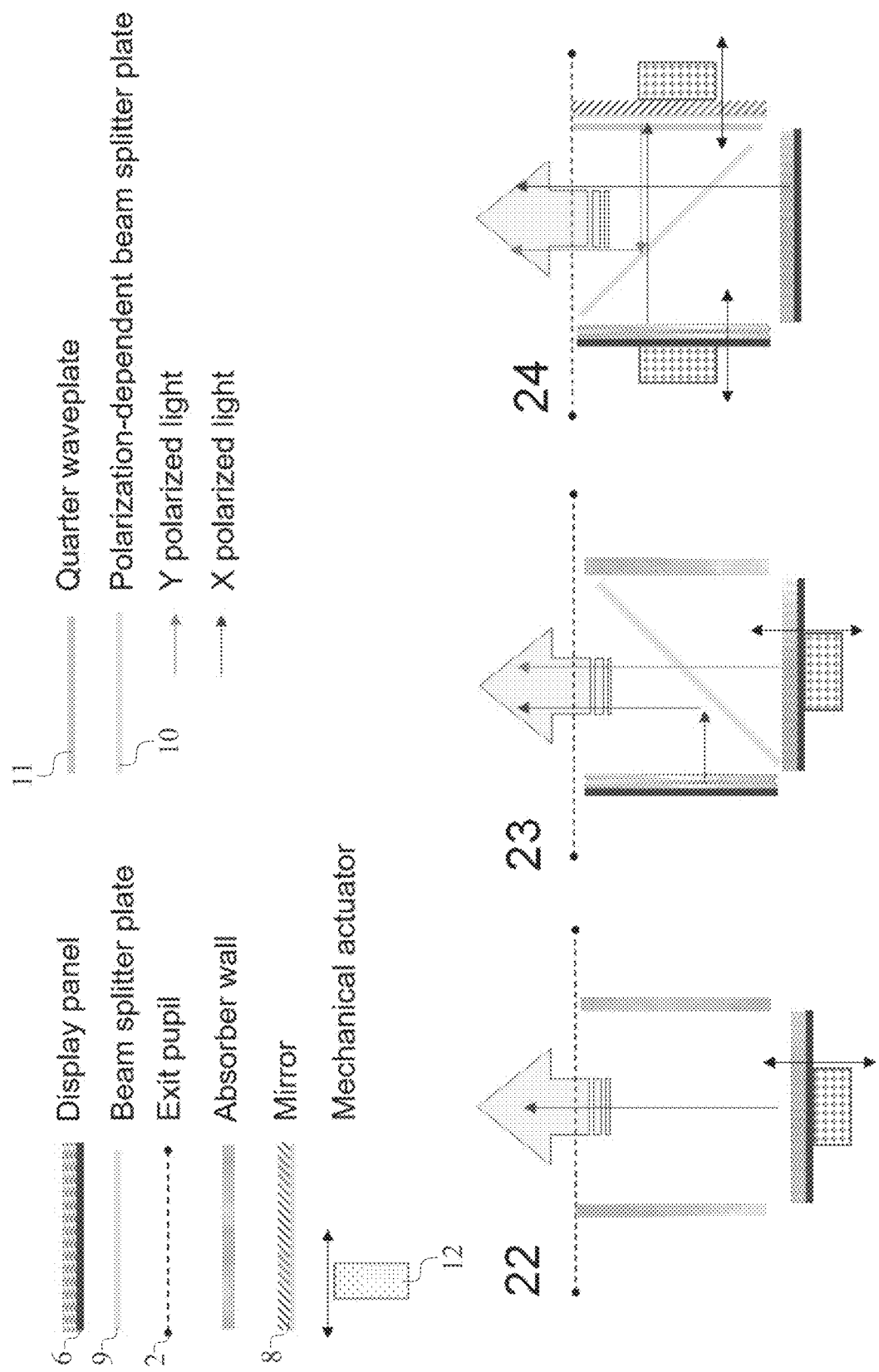
FIG. 6 illustrates examples of FE cavities with actively translated (mechanically translated) components used to adjust or sweep the focal plane through a range of depths, wherein instances of FE cavities with mechanically translated components to actively adjust or sweep the focal plane through a range of depths.

In reference to FIG. 6, the optical-tuning mechanism 7 may further comprise at least one mechanical actuator 12. As can be seen in the sections from FIG. 6, the specific cavity arrangement may be configured to translationally move the display panel 6 with a mechanical actuator 12, and/or the specific cavity arrangement may be configured to translationally move the combination of the waveplate 11 and the mirror 8 with another mechanical actuator 12.

Section 22 in FIG. 6 illustrates an embodiment of a Class I field-evolving cavity 1 comprising a single display panel 6 which is swept through a plurality of physical positions to generate digital content at a plurality of depths. Such a field-evolving cavity 1 can either be used as part of an accommodation display panel 6, where the position of the display panel 6 is adjusted to correspond to the user's vergence depth, it can be continuously swept while continuously updating the digital content displayed (to produce a light-field), or if the digital content is at a known depth, it can simply be set to match the perceived depth of the digital content. This mechanical movement can be combined with a curved relay to increase the optical range of variations in depth. This is usually necessary since mechanical translation with large range is usually not practical. Varieties of solutions can be considered for these mechanical translations such as mechanical stages, piezoelectric translators, or voice coils.

Section 23 in FIG. 6 illustrates an embodiment of a field-evolving cavity 1 combining the embodiment shown in Section 22 in FIG. 6 and the embodiment shown in Section 17 in FIG. 5, which simultaneously generates digital content at two different depths, one of which is dynamically adjustable.

Section 24 in FIG. 6 illustrates an extension of Section 23 in FIG. 6, which includes a movable mirror 8 to enable a more rapid translation of the dynamically adjustable focal plane. It simultaneously generates digital content at two different depths, one of which is dynamically adjustable. Faster transitions can be achieved by using higher order field-evolving cavities 1, however, in general, the speed of depth translation will be slow if mechanical motion is used. The speed of translation is typically directly a function of order. An example of Section 24 in FIG. 6 is the speed of tunability or translation that doubled since the light hits the right mirror 8 and therefore goes back a delta variation in the position of the mirror 8, or the display panel 6 is doubled through the roundtrip of the light. Simultaneous transition of the right display panel 6 and the left mirror 8 can quadruple the speed and range of depth variation in this example.

Figure 7:
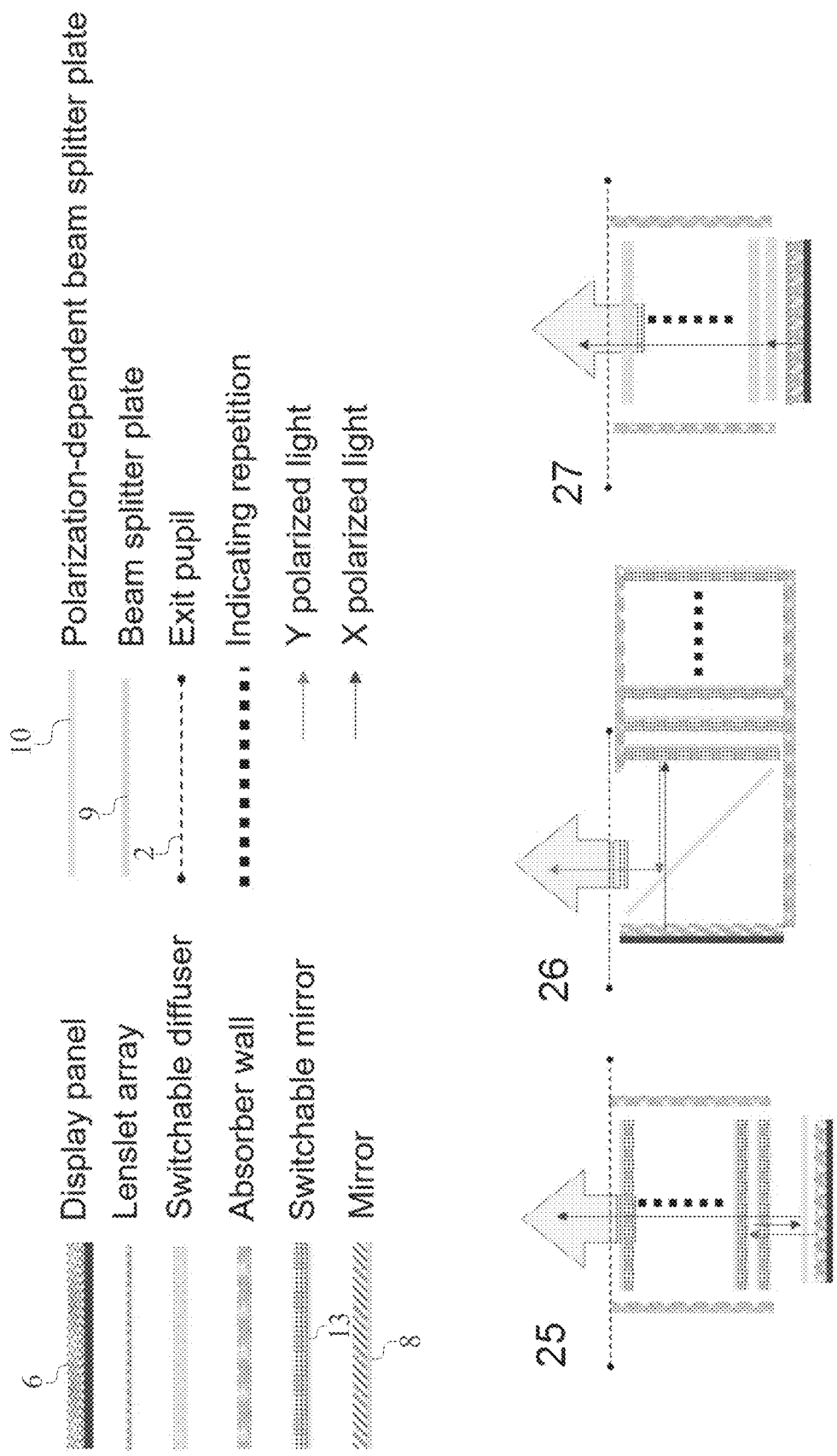
FIG. 7 illustrates instances of FE cavities that involve switchable mirror elements and switchable diffusers to change the focal depth of the exiting light, and wherein examples of display cavities using switchable mirrors (from Profiles 22, 23 in FIG. 6) and switchable diffusers (from Profile 24 in FIG. 6) to vary the display focal plane without gross mechanical motion.

In reference to FIG. 7, the optical-tuning mechanism 7 may further comprise a plurality of switchable mirrors 13 that are in serial optical communication with each other and are positioned offset from each other. As can be seen from the sections in FIG. 7, the specific cavity arrangement may be configured to selectively alternate between reflecting the optical path with at least one specified mirror from the plurality of switchable mirrors 13 and passing the optical path through the specified mirror.

Section 25 in FIG. 7 illustrates an embodiment of a field-evolving cavity 1, which utilizes a polarized display panel 6 and a stack of polarization-dependent switchable liquid crystal mirrors 13 to produce digital content at a plurality of depths, each of which is determined by the switchable mirror 13 that is activated (the one which reflects the light). There are many technologies that provide functionality for a switchable mirror 13, and a non-limiting example of a switchable mirror 13 is a liquid crystal cell (LCC) placed on top of a polarization-dependent reflector. If the incident light has the same polarization as the polarization axis of the reflective surface, the light will reflect from the switchable mirror 13. If the LCC is turned on so that the LCC makes the incident light cross polarized with the reflective polarizer, the light passes through and the mirror is rendered as transparent. There are other technologies for switchable mirrors 13 that use photorefractive or other electro-optical materials.

Section 26 in FIG. 7 illustrates a variant of Section 25 in FIG. 7, which utilizes a folded structure to double the depth separation imparted upon the output focal plane in comparison to the physical separation of the switchable mirrors 13. The depth that exits the cavity exit pupil 2 is defined by which switchable mirror 13 is turned on to reflect the light. These switchable mirrors 13 can be switched on and off with speeds comparable to the switching speed of liquid crystal material (tens of nanoseconds). In this architecture, each frame can be reflected from a different depth out of the field-evolving cavity 1 and therefore different layers in the light field can be scanned electronically and sequentially. Sequential scanning of the layers by turning on one of the switchable mirrors 13 at a time is not necessarily the most efficient way to scan the entire depth of light-field and one may use computational approaches to turn on and off switchable mirrors 13 inside the field-evolving cavity 1 in such a way as to increase overall light efficiency or brightness of the used depth. For example, if there is content only on the closest depth, there is no need to allocate more empty frames to another deeper depth. In other words, the signal to feed the display panel 6 and the switchable mirrors 13 can be processed in such a way as to maximize the frame rate and brightness dynamically at active depths.

Section 27 in FIG. 7 illustrates is an embodiment of a field-evolving cavity 1, which uses a microlens array to collimate a display panel 6 and to project digital content onto a stack of switchable diffusers. This embodiment produces digital content at a plurality of depths, each of which is determined by which diffuser is set to be diffusive. In addition, if the switchable diffusers are driven in such a way that a spatially varying diffusion is achieved, it is possible to produce a diffusive surface which is non-planar, thereby creating an output focal plane which is non-planar. The spatially varying depth of this output focal plane can then be dynamically adjusted to match the spatially varying depths of the digital content being displayed. There are many technologies available for switchable diffusers, most of these technologies depend on polymer stabilized cholesteric texture (PSCT) light shutter technology. Another way to realize Section 27 in FIG. 7 is to use polarization-dependent diffusers, which scatter light at one polarization and transmit the light at the other perpendicular polarizations. This will require a layer of liquid crystal on top of the lenslet to rotate polarization, which would correspond to different diffusers diffusing the light at different depth. Although this is theoretically viable, such arrangement would most likely produce haze artifact for deeper layers.

Figure 8:
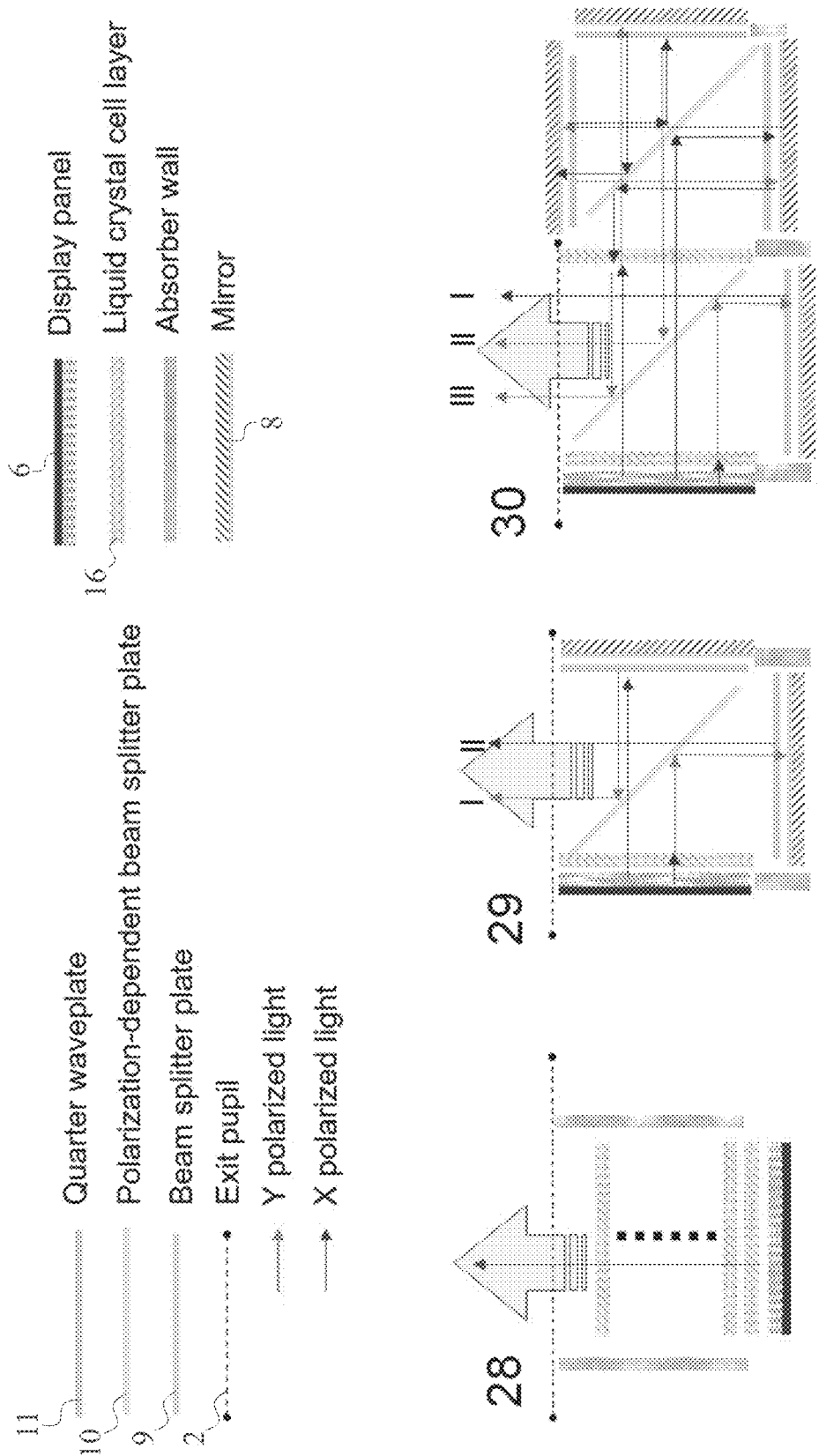
FIG. 8 illustrates examples of using switchable liquid crystal layers to switch the path that light takes inside different sections of the FE cavity, wherein instances of FE cavities using switchable liquid crystal layers to vary the display focal plane without any mechanical motion.

In reference to FIG. 8, the optical-tuning mechanism 7 comprises at least one liquid crystal cell layer 16. As can be seen from the sections in FIG. 8, the specific cavity arrangement may be configured to switch the optical path from a first linear polarization to a second linear polarization with liquid crystal cell layer 16, to tune a refractive index of the optical path with the liquid crystal cell layer 16, or a combination thereof, wherein the first linear polarization is perpendicular to the second linear polarization.

Section 28 in FIG. 8 illustrates an extension of Section 25 in FIG. 7, which generates different depths by virtue of the birefringence of transmissive liquid crystal cell layers 16 that are positioned on top of the display panel 6. As more or less of the stack of liquid crystal cell layers 16 is activated, the apparent refractive index between the display panel 6 and the cavity exit pupil 2 can be dynamically tuned. As such, this extension can generate digital content at a plurality of different depths. The amount of required variation in refractive index depends upon the design of the optical relay mechanism 3 that couples to the cavity exit pupil 2. If the optical relay mechanism 3 magnifies perceived depth, small variations in the optical path can result in large shifts in the focal plane depth that is perceived by the user.

Section 29 in FIG. 8 illustrates an alternative to Section 28 in FIG. 8, which can provide significantly larger depth steps and thereby a larger depth variation range for the focal plane compared to Section 25 in FIG. 7. It is an embodiment of a Class I field-evolving cavity 1 with a single polarized display panel 6, which passes through a liquid crystal cell layer 16 capable of rotating incident polarization. Because of the construction of the rest of the field-evolving cavity 1 (with a polarization-dependent beam splitter plate 10 and quarter waveplates 11/mirrors 8 as illustrated in FIG. 8), it is possible to use the liquid crystal cell (LCC) layer 16 to switch between two output depths. In some embodiments, the LCC layer 16 does not have any 2D matrix on it and is essentially a LCC layer 16 that rotates the polarization by 90 degrees once biased. As such, it can generate digital content at two different planes, the selection of which is determined by the state of the liquid crystal cell layer 16 (and the cavity's physical construction). In the illustrated embodiment, the display panel 6 produces horizontally polarized light (blue arrows) If the LCC layer 16 is off, the light passes through the LCC layer 16 with the same polarization, then passes through the polarization-dependent beam splitter plate 10, then hits the quarter waveplate 11 and reflector 8, then reflects with vertical polarization, then hits the beam splitter plate 9, and exits the cavity exit pupil 2 (Beam I). If the LCC layer 16 is on (biased with electricity), then the polarization rotates 90 degrees and becomes vertical, reflects from the beam splitter plate 9, goes upward, reflects off of the quarter waveplate 11/mirror structure 8 resulting in horizontal polarization, and passes through the polarization-dependent beam splitter plate 10 (Beam II).

Section 30 in FIG. 8 illustrates an extension of Section 28 in FIG. 8, which allows for one display panel 6 to generate digital content at three different depth planes, the selection of which is determined by the state of two liquid crystal cell layers 16 (and the physical construction of the field-evolving cavity 1) In addition, it can provide significantly larger depth steps and thereby a larger depth variation range for the focal plane compared to Section 25 in FIG. 7. Each liquid crystal cell layer 16 acts similar to an 2D optical valve that preserves the angular information and defines which path the light is going to take depending on the state of its polarization. Based on the state of the LCC layers 16, the three depths of I, II, and III can be generated. For example, considering the display panel 6 has horizontal polarization; in this design, the depth I is generated when LCC1 is on (LCC2 is not used for depth I). Depth II is generated when LCC1 is off and LCC2 is off. Depth III is be generated when LCC1 is off and LCC2 is on. Theoretically, this design can be extended to an infinite number of field-evolving cavities, however, each time another field-evolving cavity is added, some portion of the light will be lost, and the efficiency will be reduced.

Figure 9:
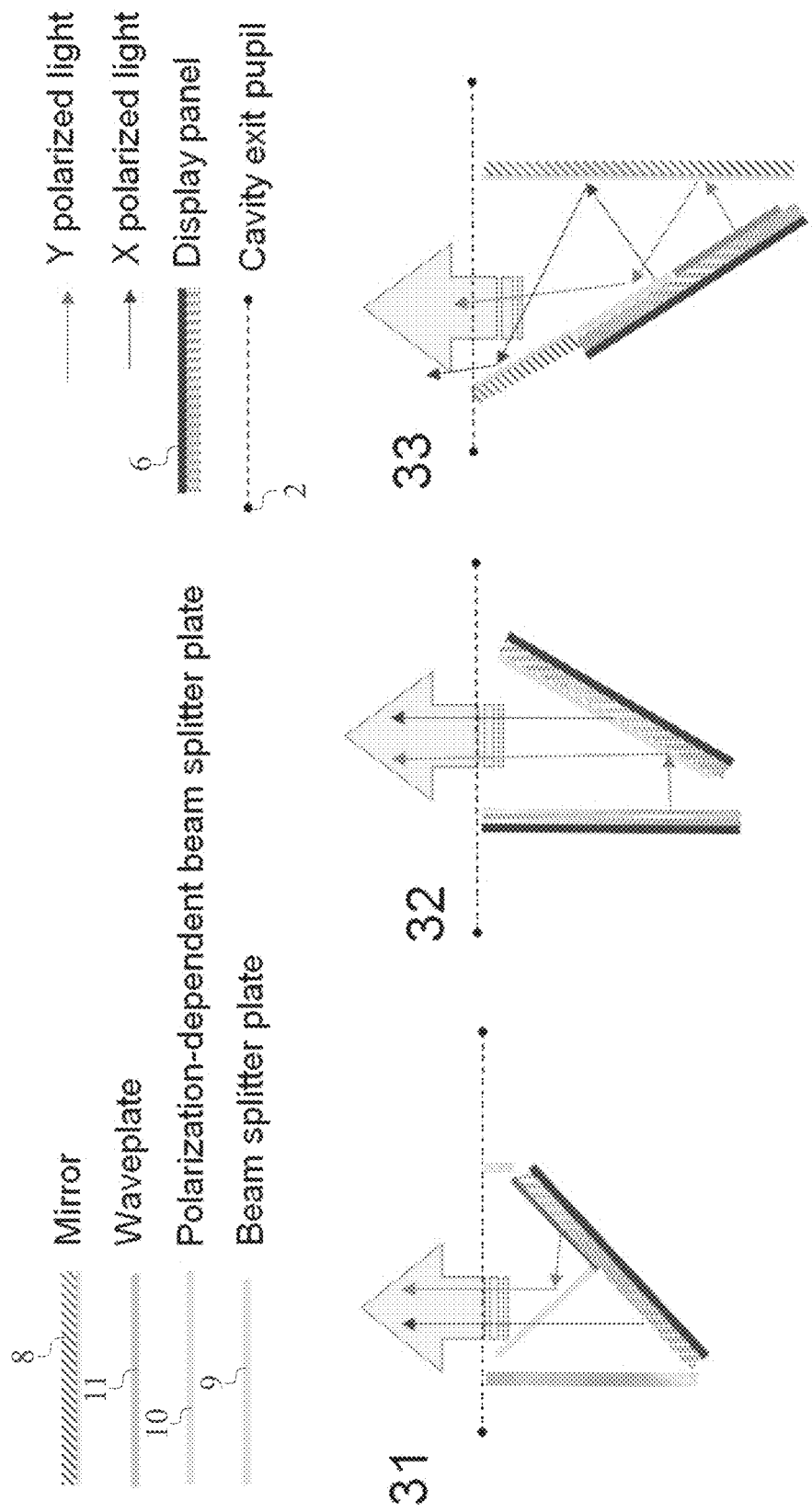
FIG. 9 illustrates examples of wedge type (or angled) FE cavities used to produce multiple focal planes, wherein in such cavities the display plane normal vectors may make angles other than multiples of 90 degrees with regards to each other, and wherein examples of compact Class I and II wedge cavities used to produce multiple focal planes in smaller form factors.

Section 31 of FIG. 9 illustrates a compact wedge cavity extension of Section 12 of FIG. 4, which uses a single display 6 instead of two display panels 6 to generate digital content simultaneously at two similar depths. By adjusting the position of the single polarization-dependent beam splitter plate 10, the depth separation between the two focal planes can be easily adjusted. It also has the benefit that light loss is minimized by leveraging the polarization of the display panel 6 in conjunction with the polarization-dependent beam splitter plate 10 and a waveplate 11.

Section 32 of FIG. 9 illustrates a compact Class II variation of Section 12 of FIG. 4, which uses two polarized display panels 6 and a polarization-dependent beam splitter plate 10 to generate digital content simultaneously at two similar depths. By adjusting the position of the display panels 6, the depth separation between the two focal planes can be easily adjusted.

Section 33 of FIG. 9 illustrates is a compact Class I wedge for a field-evolving cavity, which uses a polarized display panel 6 to generate digital content simultaneously at two depths. The angle may cause the light to exit the cavity exit pupil 2 at a desired angle.

Depth and Brightness Enhancement Mechanisms

The depth of each layer in the light field can be tuned by using glass or other high refractive index materials within the field-evolving cavity 1 or at the cavity exit pupil 2. Additionally, the brightness of the layers can be enhanced by using prismatic films on the display. The display panels 6 in the field-evolving cavity 1 usually have gaussian wide-angle profile with peak intensity at the center; this is not always beneficial in a cavity-based light-field where the reflection from a display panel 6 might be at an oblique angle. Placing prismatic films on the display panel 6 can help to tilt the peak intensity of the gaussian profile to a certain desired angle to get brighter output for that layer of the screen. The reason that high refractive index glass windows reduces the depth is that it refracts the light into a smaller cone than the original cone of the light, and, therefore, the perceived depth appears to be slightly smaller or less deep.

Figure 10:
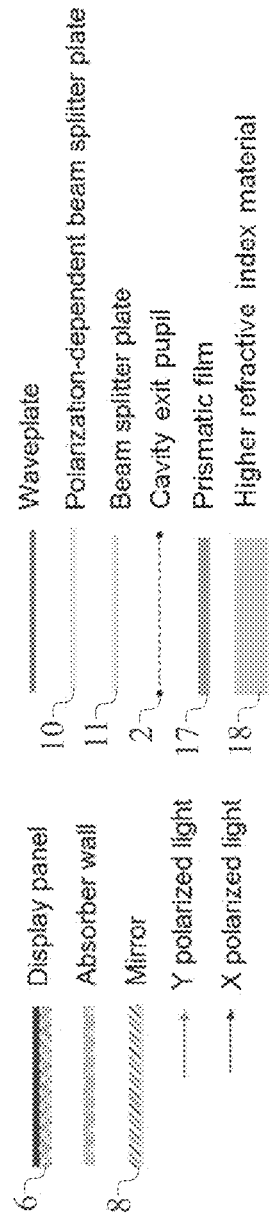
FIG. 10 illustrates instances where one or all of the depth is shifted using higher refractive index slab or prism, wherein it also shows how prismatic film can improve the brightness of a focal plane, and wherein examples of passively tuning or enhancing the depth and brightness of focal planes using material with different refractive index within the cavity volume or prismatic films.
Figure 10:
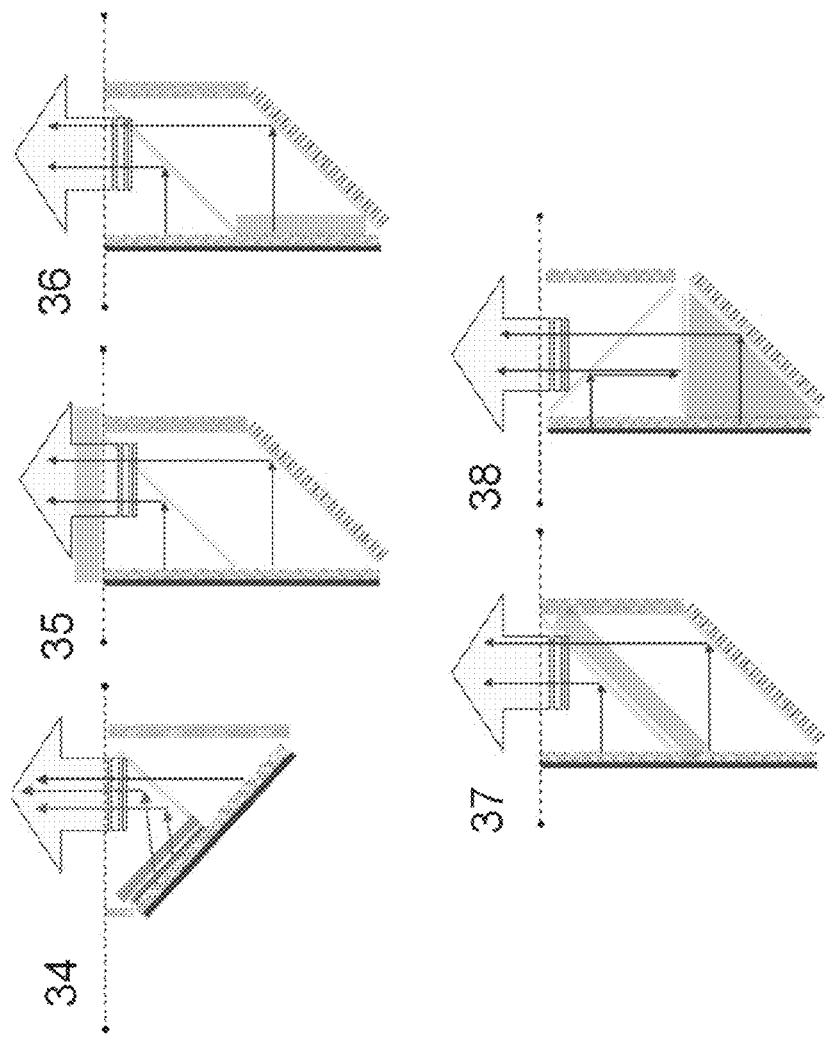

In reference to FIG. 10, the optical-tuning mechanism 7 may further comprise at least one prismatic film 17 and at least one piece of higher refractive index material 18. As can be seen from the sections from FIG. 10, the specific cavity arrangement may be configured to enhance a brightness of the optical path with the prismatic film 17, and/or the specific cavity arrangement may be configured to lower a depth of the focal plane along the optical path with the piece of higher index material 18.

Section 34 of FIG. 10 illustrates an example case where a prismatic film 17 can increase the brightness by tilting the peak of the gaussian profile of the intensity toward the reflector. Prismatic films 17 always help if the cavity exit pupil 2 looks at the display panel 6 in any angle other than 90 degrees angle.

Section 35 of FIG. 10 illustrates an example of Class I field-evolving cavity 1 with a first order of the cavity exit pupil 2, where both of the depth are perceived to be slightly less deep inside the field-evolving cavity 1 due to high refractive index 18 at the cavity exit pupil 2.

Section 36 of FIG. 10 illustrates is an example of Class I field-evolving cavity 1 with a first order of the cavity exit pupil 2, where deeper focal plane has become slightly less deep to the cavity exit pupil 2 due to high refractive index 18 on the display panel 6.

Section 37 of FIG. 10 illustrates is an example of Class I field-evolving cavity 1 with a first order of the cavity exit pupil 2, where deeper focal plane has become slightly less deep to the cavity exit pupil 2 due to high refractive index 18 on the back of the reflector 8 for the closer depth.

Section 38 of FIG. 10 illustrates is an example of Class I field-evolving cavity 1 with a first order of the cavity exit pupil 2, where deeper focal plane has become notably less deep to the cavity exit pupil 2 due to high refractive index 18 on the entire lower section of the field-evolving cavity 1. In essence, the bottom reflector 8 is replaced with a high refractive index prism 18.

Relay Mechanisms and Application Modalities

As mentioned previously, the cavity exit pupil 2 delivers light into a relay mechanism 3, resulting in different reference apexes of divergence for different focal planes being presented to the user. The relay mechanism 3 can be an off-axis visor, a geometrical or diffractive waveguide, a birdbath design beam splitter, or any other suitable relay means.

Figure 11:
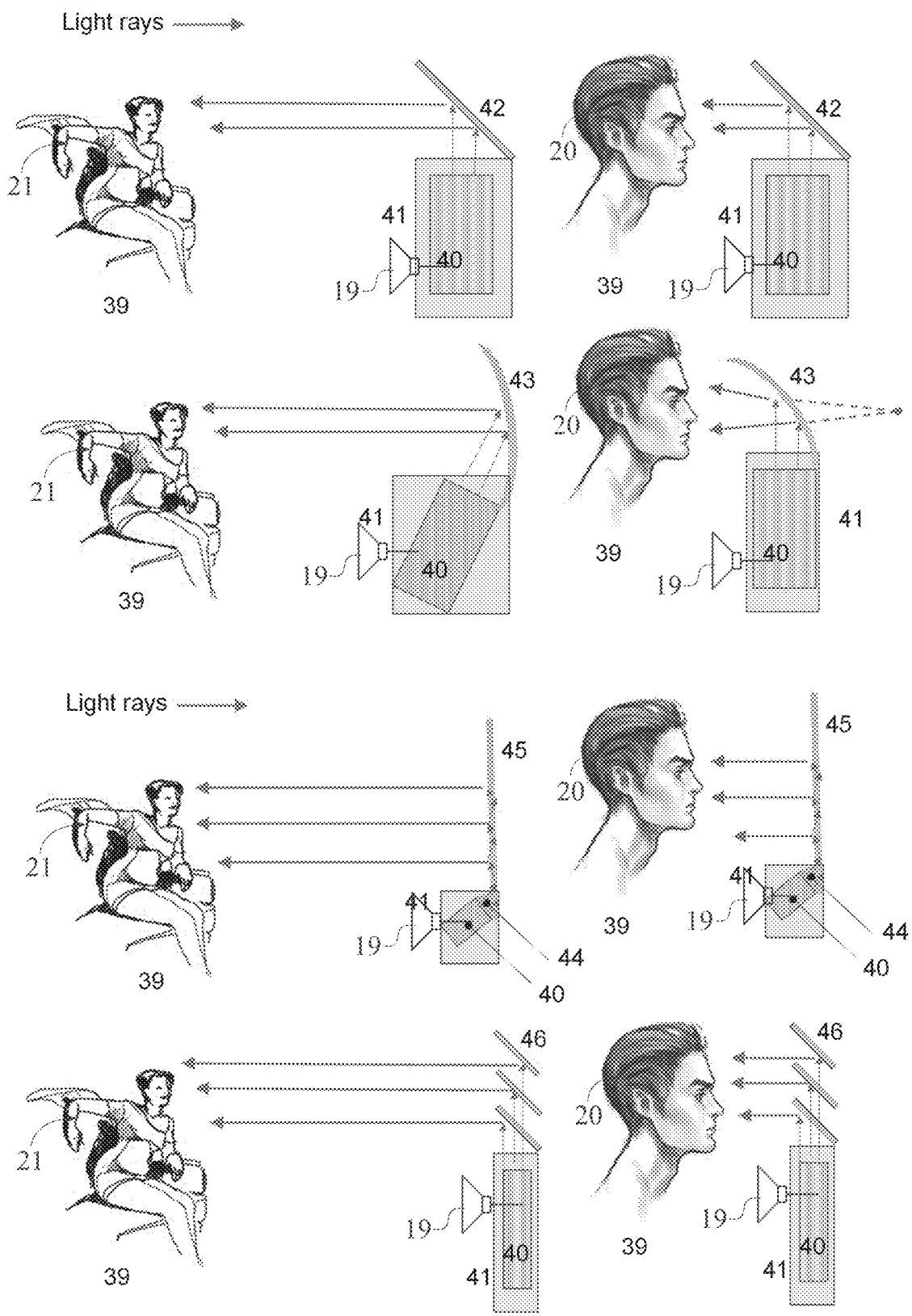
FIG. 11 illustrates instances of relay system that can be used to relay light from the cavity to the outside world, wherein the display might be used as a far standing display or it might be used very close to the head as on a desktop, and wherein the relays might be fully transparent or opaque they might be curved or flat; one piece or made of multiple switching sections, and wherein diagrams showing how display cavities' output can be relayed to the viewer as part of an entertainment system or a magnified monitor, and wherein the left column shows entertainment system modalities while the right side shows magnified near head display modality.

FIG. 11 and the following descriptions provide non-limiting examples of relay mechanism 3 which can be used to direct the output of a field-evolving cavity 1 to the viewer. In one example, the light exits the cavity exit pupil 2 onto a visor and moves toward the eye. In another example, the light exits a smaller cavity and is fed to a large size waveguide that then redirects the light toward the viewer.

In reference to FIG. 11, the diagram showing how the output of the field-evolving cavity 1 can be relayed to the viewer as part of an entertainment system or a magnified monitor. The left column shows entertainment system modalities, and the right column shows magnified near-head display modality. In general, a near-head mount 20 may be operatively coupled to the system enclosure 5, wherein the near-head mount 20 is used to position the system enclosure 5 adjacent to a user's head. Moreover, an entertainment stand 21 is operatively coupled to the system enclosure 5, wherein the entertainment stand 21 is used to position the system enclosure 5 offset from a user's head. Furthermore, at least one audio output device 19 is electronically connected to the display panel 6.

Reference 39 in FIG. 11 illustrates the viewer either in near head modality 20 or entertainment system modality 21 where the viewer is further than 60 centimeters (cm) from the display.

Reference 40 in FIG. 11 illustrates a generalized display cavity (i.e. the at least one field-evolving cavity 1) producing digital content (stereoscopic or 2D) at one or more depths.

Reference 41 in FIG. 11 illustrates the casing (i.e. the system enclosure 5) of the at least one field-evolving cavity 1 that holds the rest of the electronics of the system.

Reference 42 in FIG. 11 illustrates an example of an angled reflector relay (i.e. the relay mechanism 3) where a reflective, semi-reflective or switchable mirror surface is used to relay the cavity exit pupil 2 to the enclosure exit pupil 4 and therefore the viewer.

Reference 43 in FIG. 11 illustrates an example of a curved angled reflector relay (i.e. the relay mechanism 3) where a curved reflective, semi-reflective or switchable mirror surface is used to relay the cavity exit pupil 2 to the enclosure exit pupil 4 and therefore the viewer. The curvature of this relay can change the depth of the content coming from the original depth of the cavity to further or closer distances.

Reference 44 in FIG. 11 illustrates a coupling optics that couples the cavity exit pupil 2 to the entrance pupil of the waveguide (i.e. the relay mechanism 2).

Reference 45 in FIG. 11 illustrates a geometrical or diffractive waveguide (i.e. the relay mechanism 2), which redirects the output of FE Cavity (made with LCoS and reflectors or DMD and reflectors or LCD panels and reflectors or array of projectors) to the viewer. These waveguides can be multimode geometrical, diffractive, or real single mode-confined waveguides.

Reference 46 in FIG. 11 illustrates a compressed relay system (i.e. the relay mechanism 2) that will be further detailed in the next section of this disclosure. The compressed relay system helps to have more compact form-factor for the display.

Compressed Designs

Figure 12:
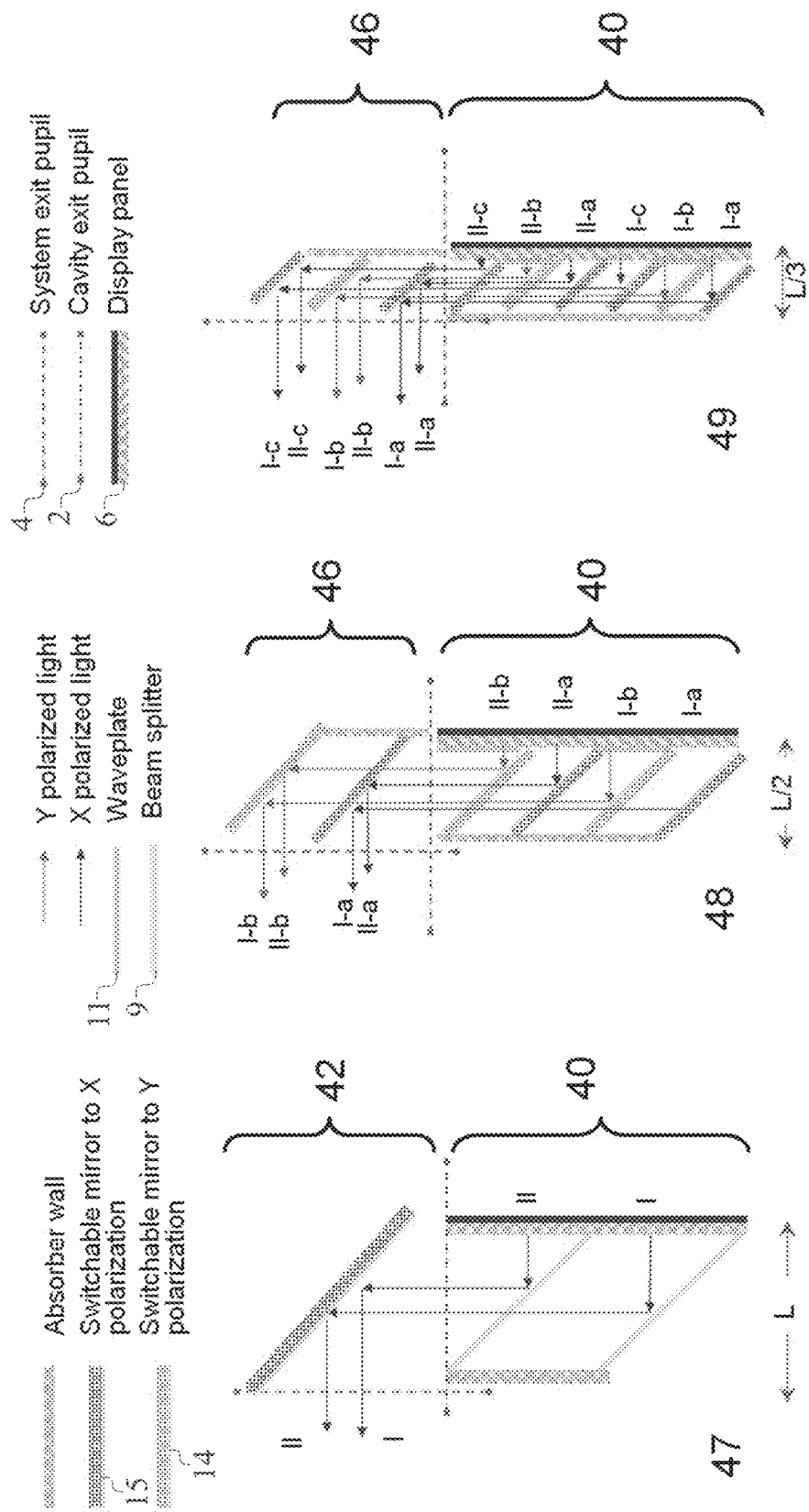
FIG. 12 illustrates instances of compressed FE cavity based on switchable mirror the thickness of the cavity (L) can be reduced by having the reflectors turned on and off sequentially, wherein diagrams showing how the compressed architecture with switchable mirrors in Class I FE cavities can compress the size of the system.

The single reflectors can be bulky both inside the FE cavity 1 and as the relay. FIG. 12 shows few non limiting examples of such compressed designs based on spatial stacking of switchable mirrors.

In reference to FIG. 12, an operative combination of the at least one field-evolving cavity 1 and the relay mechanism 3 may comprise a plurality of switchable mirrors that are in serial optical communication with each other and are positioned offset from each other. Moreover, the plurality of switchable mirrors may comprise a plurality of first switchable mirrors 14 and a plurality of second switchable mirrors 15 so that the plurality of first switchable mirrors 14 is interspersed amongst the plurality of second switchable mirrors 15. As can be seen in the sections of FIG. 12, the specific cavity arrangement being configured to selectively alternate between reflecting the optical path in a first polarization with at least one specified first switchable mirror from the plurality of first switchable mirrors 14 and passing the optical path through the specified first switchable mirror, while the specific cavity arrangement is further configured to selectively alternate between reflecting the optical path in a second polarization with at least one specified second switchable mirror from the plurality of second switchable mirrors 15 and passing the optical path through the specified second switchable mirror. This allows the plurality of first switchable mirrors 14 and the plurality of second switchable mirrors 15 to be configured to compress an occupying volume of the operative combination of the at least one field-evolving cavity 1 and the relay mechanism 3. Section 47 of FIG. 12 shows an example system where there is no compression with Class I FE cavity 1 and two depth similar to Section 6 in FIG. 3A. The light exits the cavity exit pupil 2 (shown by blue dashed line) and reflects from Reference 42 in FIG. 12 (i.e. the relay mechanism 2) and exits the enclosure exit pupil 4 (shown in the red dashed line). The deeper light I is coming from depth I, and the light II is coming from a closer distance inside the field-evolving cavity 1. The system is obligated to have minimum thickness of L obligated by the dimensions of the display panel 6. For the same dimensions of the display panel 6, Section 48 of FIG. 12 reduces the thickness to half (L/2). This compression is obtained by having a stack of relays which are transparent relative to which other either by means of temporal switching of the switchable mirrors or by polarization. Therefore, in Section 48 of FIG. 12, the deeper depth I has two sections I-a and I-b which are relayed at two different distances, the distances in relay work in such a way that I-a and I-b both end up having the same depth as depth I but will span the same size for the enclosure exit pupil 4 as in Section 47 of FIG. 12. The same thing is happening for the closer depth II. The depth is diced to two relays which expand the enclosure exit pupil 4 but have less thickness. This approach can be extended for further compression. Moreover, Section 49 in FIG. 12 shows the case where the thickness in relation to Section 47 of FIG. 12 is compressed by factor of three. Here each depth level is spatially multiplexed to three sections which are compensated by the height of the three relay switchable mirrors 14, 15. For example, the path that I-a and I-b and I-c travels to the enclosure exit pupil 4 (shown in the red dashed line) is equal, and, thus, all of them have the same depth as depth I. However, they exit at different heights therefore expanding the enclosure exit pupil 4 back to the size of the enclosure exit pupil 4 in Section 47 of FIG. 12.

Example Prototype

Figure 13:
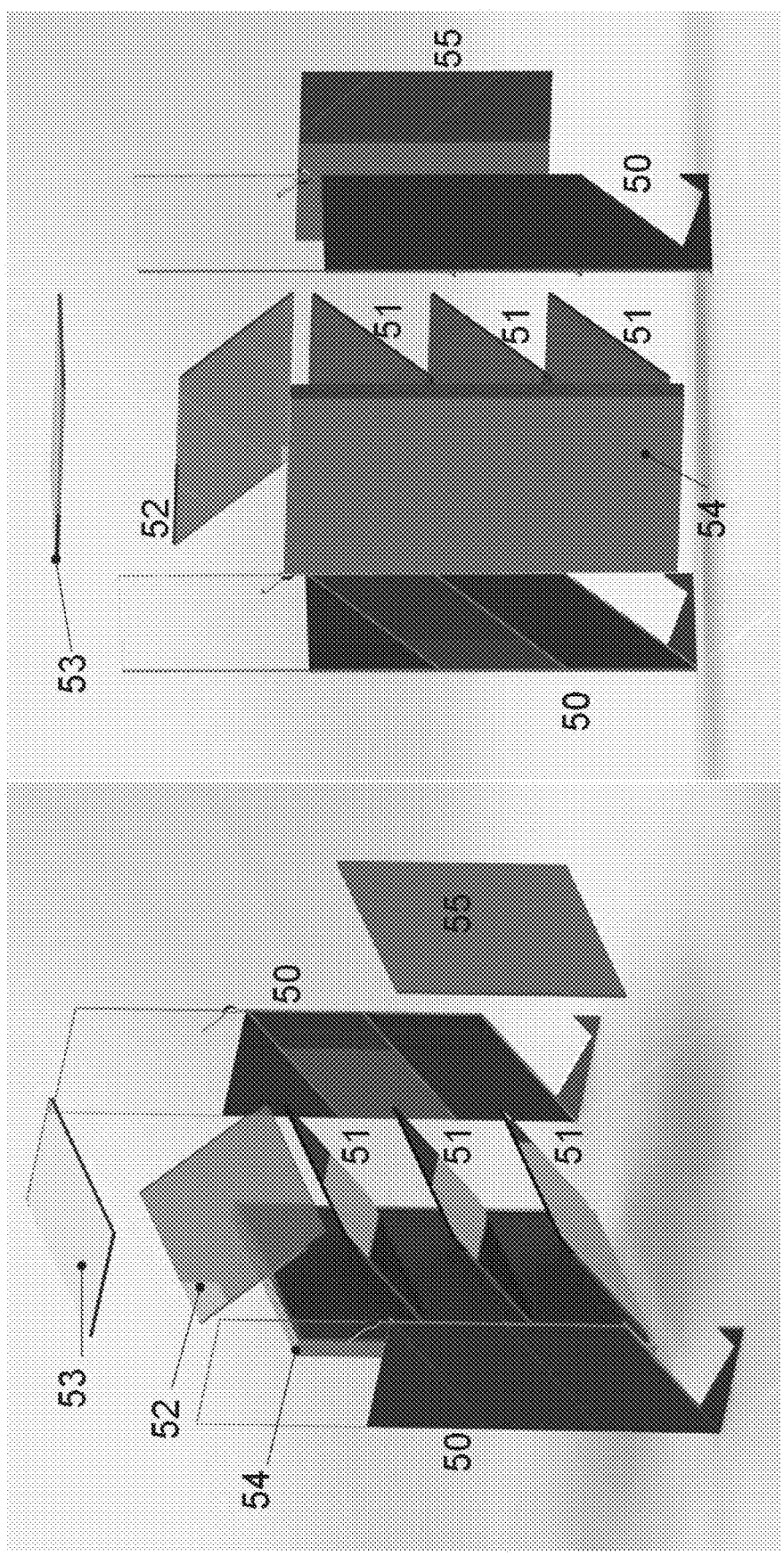
FIG. 13 illustrates the exploded view of a prototype model of a 3-layer-light-field, wherein a 3D model of a prototype system, and wherein the left is the back of the exploded model while the right is the front of the display, and wherein the light field exits the green reflector on top.

FIG. 13 shows the exploded 3D model of a prototype system previously shown with no details in FIG. 1 with three depths from the back on the left and from the front on the right. The components are as below:

Reference 50 in FIG. 13 (i.e. components of the system enclosure 5) are side holders of the assembly. Reference 51 in FIG. 13 (i.e. components of the optical tuning mechanism 7) are reflective or semi-reflective surfaces. Reference 52 in FIG. 13 is a simple reflective mirror working as the relay mechanism 3. Reference 51 in FIG. 13 (i.e. component of the system enclosure 5) is a top cap just for protection of the relay mechanism 3. Reference 54 in FIG. 13 (i.e. the display panel 6) is an LCD panel that is divided at three depths. Reference 55 in FIG. 13 (i.e. component of the system enclosure 5) is a back cover of the FE cavity 1.

Advantages and Improvements Over Existing Methods

The arrangements, methods and assembly of components in this description confer a variety of advantages and improvements over existing 3D systems:

Ergonomic advantages and improvements

Accommodation-vergence conflict mitigation—the present invention described herein can produce digital content at multiple depths with true monocular optical wavefront. The flexibility to display digital content at multiple depths enables the presentation of digital content at an optical depth which matches or is similar to the binocular disparity depth cue presented to the viewer, thereby helping to resolve any accommodation-vergence conflict experienced by the viewer. Mitigating accommodation-vergence conflict makes the digital content more comfortable to view for extended periods of time and increases the sense of realism experienced by the user viewing the digital content.

Size reduction—Because the present invention allows for folding of optical paths, it offers flexibility in terms of packaging compared to systems that use projectors. This enables smaller systems Unlike auto stereoscopic 3D systems which are limited in view zone distance and angle and sometimes allow only few viewers to see the 3D content, the present invention allows up to 150 degree (depending on number of depth) viewable angle and does not have limitation in number of users.

The FE cavities 1 can be combined with any type of panels and light engines so they are not limited to a specific technology, if needed they can also use autostereoscopic displays as an engine to enhance their performance in depth accuracy Reduced cost—As opposed to using eye tracking based accommodation displays or holographic displays, the present invention can utilize readily available components (flat display panels) which are ready for mass production, significantly reducing overall system cost and technical challenges.

Since FE cavity 1 based system allow true optical depth, they allow the enclosure exit pupil 4 to sit very close to the eye without any eye fatigue since the true optical depth of the images can be far back. Unlike stereoscopic displays, this opens a whole new set of possibilities for near head displays where the size of the display can be magnified with no need to wear anything or have a large screen.

For most of the designs with passive glass reflector or even switchable mirrors herein, the images provided by FE cavities 1 have no artifacts such as haze, color nonuniformity, distortion, and moiré artifacts.

Performance advantages and improvements

Bandwidth reduction—The present invention as described herein allows for solving or mitigating accommodation-vergence conflict without having to present the entire 5D plenoptic function to the viewer. This reduces the complexity of content rendering and can improve system frame rates compared to full light-field displays. The bandwidth can be reduced by orders of magnitude.

Optical efficiency flexibility—The present invention is flexible in that if optical efficiency is a priority, a design can be chosen that has high light throughput. If display brightness is not needed, additional flexibility exists to add more display planes or use simpler cavity designs.

Spatial resolution flexibility—The present invention is flexible in that spatial resolution can be maintained by using multiple display panels 6. If spatial resolution is not needed (for instance if individual pixels are already not resolvable by the user), the present invention can utilize unnecessary spatial resolution to render a different depth plane, improving the user experience Expandability—FE cavities 1 are conveniently expandable in architecture, number of planes and expansion to different display systems.

Compatibility—The present invention introduced herein have significant advantage in compatibility both on the software level and hardware level. At the software level, since the light source can be ultimately a 2D screen, the feed to the display system can be easily fed with conventional standard signals. Also this simplifies the rendering as there is no fundamental need for significant computational processing of the input due to depth providing optics. The hardware architecture is integral of wide variety of existing 2D display systems.

Functional advantages and improvements

Monitor magnification—Since the depth of the systems disclosed herein are true optical depth, the eye can accommodate and view these 3D content with no discomfort at any given distance of the display. For example, if the display is 20 cm away from the head but the depth that is shown is still 2 meters, the viewer sees the image as 2 meters away and can use the monitor even at such a close distance. This help to magnify small sized monitors using true optical depth provided by disclosed systems.

Heads up displays—The relay can be semitransparent since the depth can be much further than the actual position of the display, which makes a perfect case for large scale superposition of the image to the real world, specially in the context of the heads up display.

Entertainment—The light field experience provides better sense of realism due to accurate optical depth and artifact free images. This can be used for home entertainment, gaming, and commercial entertainment applications.

Commercial Applications

Many commercial applications become possible with the dramatic accuracy in depth, transparency of the screen and sense of immersion. What follows is a non-exhaustive list of possible applications:

Navigation

Turn by turn directions while driving/piloting/etc. using heads up displays without having to look away from the road or fumble with a phone or separate navigation device.

Medical

Better investigation of 3D data files using the light-field displays.

Workplace Ergonomics

Magnified displays can provide a convenient replacement for large displays without the need to wear any hardware or the need to have a large screen. The 3D nature of the display can provide a volume for office work with pixel accuracy that is equal to the standard monitors today.

Entertainment

The layered nature of FE cavities 1 provides ease in content generation from game and video industry.

This is because rendering in few layers to provide 3D effect is much easier (less computationally demanding) than rendering the entire 3D environment.

The FE cavities 1 are well suited for stand-alone game machines since the true depth attracts viewers due to new experience.

Design

Previewing the look and feel of objects which have yet to be physically prototyped Visualizing 3D content for modeling and design in AR or VR without having to wear headsets. This is very important since developers cannot wear headset for long hours, but they can use the present invention with true optical depth.

Although the invention has been explained in relation to its preferred embodiment, it is to be understood that many other possible modifications and variations can be made without departing from the spirit and scope of the invention as hereinafter claimed.

What is claimed is:

1. A system for generating compact light-field displays through varying optical depths comprising:
   a system enclosure;
   a field-evolving cavity;
   a relay mechanism;
   the system enclosure comprising an enclosure exit pupil;
   the field-evolving cavity comprising at least one display panel, at least one optical-tuning mechanism, and a cavity exit pupil;
   the field-evolving cavity and the relay mechanism being mounted within the enclosure;
   the display panel and the optical-tuning mechanism being configured into a specific optical arrangement, wherein a specific cavity arrangement is used to generate at least one light-field display with at least one focal plane along at least one optical path;
   the optical path traversing from the display panel to the cavity exit pupil;
   the cavity exit pupil being in optical communication with the enclosure exit pupil through the relay mechanism;
   the optical-tuning mechanism comprising a plurality of switchable mirrors;
   the plurality of switchable mirrors being in serial optical communication with each other;
   the plurality of switchable mirrors being positioned offset from each other; and
   the specific cavity arrangement being configured to selectively alternate between reflecting the optical path with at least one specified mirror from the plurality of switchable minors and passing the optical path through the specified mirror.

2. The system for generating compact light-field displays through varying optical depths as claimed in claim 1 further comprising:
   the display panel being positioned along a single axis; and
   the single axis being positioned either perpendicular or parallel to the cavity exit pupil.

3. The system for generating compact light-field displays through varying optical depths as claimed in claim 1 further comprising:
   the at least one display panel being a plurality of display panels;
   the plurality of display panels being positioned along a pair of axes;
   the pair of axes being positioned perpendicular to each other; and
   each of the pair of axes being positioned either perpendicular or parallel to the cavity exit pupil.

4. The system for generating compact light-field displays through varying optical depths as claimed in claim 1 further comprising:
   the display panel being arranged along an alignment axis; and
   the alignment axis being oriented at an angle to the cavity exit pupil.

5. The system for generating compact light-field displays through varying optical depths as claimed in claim 1 further comprising:
   the optical-tuning mechanism further comprising at least one mirror; and
   the specific cavity arrangement being further configured to reflect the optical path with the mirror.

6. The system for generating compact light-field displays through varying optical depths as claimed in claim 1 further comprising:
   the optical-tuning mechanism further comprising at least one beam splitter plate; and
   the specific cavity arrangement being further configured to reflect the optical path with the beam splitter plate, to pass the optical path through the beam splitter plate, or combinations thereof.

7. The system for generating compact light-field displays through varying optical depths as claimed in claim 1 further comprising:
   the optical-tuning mechanism further comprising at least one polarization-dependent beam splitter plate; and
   the specific cavity arrangement being further configured to reflect the optical path in a first polarization with the polarization-dependent beam splitter plate, to pass the optical path in a second polarization through the polarization-dependent beam splitter plate, or combinations thereof, wherein the first polarization is opposite to the second polarization.

8. The system for generating compact light-field displays through varying optical depths as claimed in claim 1 further comprising:
   the optical-tuning mechanism further comprising at least one waveplate and at least one mirror; and
   the specific cavity arrangement being further configured to switch the optical path from a first linear polarization to a second linear polarization with a combination of the waveplate and the mirror, wherein the first linear polarization is perpendicular to the second linear polarization.

9. The system for generating compact light-field displays through varying optical depths as claimed in claim 8 further comprising:
   the optical-tuning mechanism further comprising at least one mechanical actuator; and
   the specific cavity arrangement being further configured to translationally move the combination of the waveplate and the mirror with the mechanical actuator.

10. The system for generating compact light-field displays through varying optical depths as claimed in claim 1 further comprising:
    the optical-tuning mechanism further comprising at least one mechanical actuator; and
    the specific cavity arrangement being further configured to translationally move the display panel with the mechanical actuator.

11. The system for generating compact light-field displays through varying optical depths as claimed in claim 1 further comprising:
    the optical-tuning mechanism further comprising at least one liquid crystal cell layer; and the specific cavity arrangement being further configured to switch the optical path from a first linear polarization to a second linear polarization with the liquid crystal cell layer, to tune a refractive index of the optical path with the liquid crystal cell layer, or a combination thereof, wherein the first linear polarization is perpendicular to the second linear polarization.

12. The system for generating compact light-field displays through varying optical depths as claimed in claim 1 further comprising:
the optical-tuning mechanism further comprising at least one prismatic film; and
the specific cavity arrangement being further configured to enhance a brightness of the optical path with the prismatic film.

13. The system for generating compact light-field displays through varying optical depths as claimed in claim 1 further comprising:
the optical-tuning mechanism further comprising at least one piece of higher refractive index material; and
the specific cavity arrangement being further configured to lower a depth of the focal plane along the optical path with the piece of higher index material.

14. The system for generating compact light-field displays through varying optical depths as claimed in claim 1, wherein the relay mechanism is selected from a group consisting of: an angled reflector relay, a curved angled reflector relay, a waveguide, and a compressed relay system.

15. The system for generating compact light-field displays through varying optical depths as claimed in claim 1 further comprising:
an operative combination of the at least one field-evolving cavity and the relay mechanism comprising a plurality of switchable mirrors;
the plurality of switchable minors comprising a plurality of first switchable mirrors and a plurality of second switchable mirrors;
the plurality of switchable mirrors being in serial optical communication with each other;
the plurality of switchable mirrors being positioned offset from each other;
the plurality of first switchable mirrors being interspersed amongst the plurality of second switchable mirrors;
the specific cavity arrangement being further configured to selectively alternate between reflecting the optical path in a first polarization with at least one specified first switchable mirror from the plurality of first switchable mirrors and passing the optical path through the specified first switchable mirror;
the specific cavity arrangement being further configured to selectively alternate between reflecting the optical path in a second polarization with at least one specified second switchable mirror from the plurality of second switchable mirrors and passing the optical path through the specified second switchable mirror; and
the plurality of first switchable mirrors and the plurality of second switchable mirrors being configured to compress an occupying volume of the operative combination of the at least one field-evolving cavity and the relay mechanism.

16. The system for generating compact light-field displays through varying optical depths as claimed in claim 1 further comprising:
at least one audio output device; and
the audio output device being electronically connected to the display panel.

17. The system for generating compact light-field displays through varying optical depths as claimed in claim 1 further comprising:
a near-head mount; and
the near-head mount being operatively coupled to the system enclosure, wherein the near-head mount is used to position the system enclosure adjacent to a user's head.

18. The system for generating compact light-field displays through varying optical depths as claimed in claim 1 further comprising:
an entertainment stand; and
the entertainment stand being operatively coupled to the system enclosure, wherein the entertainment stand is used to position the system enclosure offset from a user's head.

\* \* \* \* \*